United States Patent
d'Armancourt

(10) Patent No.: US 10,373,032 B2
(45) Date of Patent: Aug. 6, 2019

(54) CRYPTOGRAPHIC PRINTHEAD

(71) Applicant: Datamax-O'Neil Corporation, Orlando, FL (US)

(72) Inventor: Sébastien Michel Marie Joseph d'Armancourt, Singapore (SG)

(73) Assignee: Datamax-O'Neil Corporation, Orlando, FL (US)

( * ) Notice: Subject to any disclaimer, the term of this patent is extended or adjusted under 35 U.S.C. 154(b) by 0 days.

(21) Appl. No.: 15/665,705

(22) Filed: Aug. 1, 2017

(65) Prior Publication Data

US 2019/0042901 A1 Feb. 7, 2019

(51) Int. Cl.
  *H04N 1/32* (2006.01)
  *G06K 15/00* (2006.01)
  *G06K 15/02* (2006.01)
  *B41J 2/355* (2006.01)

(52) U.S. Cl.
  CPC .......... *G06K 15/4095* (2013.01); *B41J 2/355* (2013.01); *G06K 15/028* (2013.01); *H04N 1/32272* (2013.01); *H04N 2201/3281* (2013.01)

(58) Field of Classification Search
  CPC ... G06K 15/4095; G06K 15/028; B41J 2/355; H04N 1/32272; H04N 2201/3281
  See application file for complete search history.

(56) References Cited

U.S. PATENT DOCUMENTS

| 5,583,779 | A | 12/1996 | Naclerio et al. |
| 6,056,455 | A * | 5/2000 | Klaus .................... B41J 2/2132 400/176 |
| 6,250,824 | B1 * | 6/2001 | Ogiyama ................. B41J 2/325 347/172 |
| 6,832,725 | B2 | 12/2004 | Gardiner et al. |
| 7,039,185 | B2 | 5/2006 | Campagna et al. |
| 7,128,266 | B2 | 10/2006 | Zhu et al. |
| 7,159,783 | B2 | 1/2007 | Walczyk et al. |
| 7,413,127 | B2 | 8/2008 | Ehrhart et al. |
| 7,726,575 | B2 | 6/2010 | Wang et al. |

(Continued)

FOREIGN PATENT DOCUMENTS

WO 2013163789 A1 11/2013

*Primary Examiner* — Yaovi M Ameh
(74) *Attorney, Agent, or Firm* — Additon, Higgins & Pendleton, P.A.

(57) ABSTRACT

A printer is configured with a processor which calculates printhead control parameters, the control parameters being determined by the processor in such a way as to optimize the printing process of the printer's printhead. The processor determines the printhead control parameters according to an optimization algorithm stored in the printer. To maintain the internal security of the optimization algorithm, the printhead control parameters are encrypted by the processor. The encrypted printhead control parameters are then transmitted to the printhead via an internal data path of the printer. If a third party monitors the data along the internal data path, the encryption algorithm remains secure because the control parameters are encrypted. The printhead contains a second, dedicated processor. The printhead processor receives the encrypted printhead control parameters, and decrypts the control parameters. The printhead then prints according to the decrypted printhead control parameters, ensuring optimized printing.

17 Claims, 5 Drawing Sheets

Exemplary Thermal Printer

(56) References Cited

U.S. PATENT DOCUMENTS

| | | |
|---|---|---|
| 8,294,969 B2 | 10/2012 | Plesko |
| 8,317,105 B2 | 11/2012 | Kotlarsky et al. |
| 8,322,622 B2 | 12/2012 | Liu |
| 8,366,005 B2 | 2/2013 | Kotlarsky et al. |
| 8,371,507 B2 | 2/2013 | Haggerty et al. |
| 8,376,233 B2 | 2/2013 | Van Horn et al. |
| 8,381,979 B2 | 2/2013 | Franz |
| 8,390,909 B2 | 3/2013 | Plesko |
| 8,408,464 B2 | 4/2013 | Zhu et al. |
| 8,408,468 B2 | 4/2013 | Horn et al. |
| 8,408,469 B2 | 4/2013 | Good |
| 8,424,768 B2 | 4/2013 | Rueblinger et al. |
| 8,448,863 B2 | 5/2013 | Xian et al. |
| 8,457,013 B2 | 6/2013 | Essinger et al. |
| 8,459,557 B2 | 6/2013 | Havens et al. |
| 8,469,272 B2 | 6/2013 | Kearney |
| 8,474,712 B2 | 7/2013 | Kearney et al. |
| 8,479,992 B2 | 7/2013 | Kotlarsky et al. |
| 8,490,877 B2 | 7/2013 | Kearney |
| 8,517,271 B2 | 8/2013 | Kotlarsky et al. |
| 8,523,076 B2 | 9/2013 | Good |
| 8,528,818 B2 | 9/2013 | Ehrhart et al. |
| 8,544,737 B2 | 10/2013 | Gomez et al. |
| 8,548,420 B2 | 10/2013 | Grunow et al. |
| 8,550,335 B2 | 10/2013 | Samek et al. |
| 8,550,354 B2 | 10/2013 | Gannon et al. |
| 8,550,357 B2 | 10/2013 | Kearney |
| 8,556,174 B2 | 10/2013 | Kosecki et al. |
| 8,556,176 B2 | 10/2013 | Van Horn et al. |
| 8,556,177 B2 | 10/2013 | Hussey et al. |
| 8,559,767 B2 | 10/2013 | Barber et al. |
| 8,561,895 B2 | 10/2013 | Gomez et al. |
| 8,561,903 B2 | 10/2013 | Sauerwein |
| 8,561,905 B2 | 10/2013 | Edmonds et al. |
| 8,565,107 B2 | 10/2013 | Pease et al. |
| 8,571,307 B2 | 10/2013 | Li et al. |
| 8,579,200 B2 | 11/2013 | Samek et al. |
| 8,583,924 B2 | 11/2013 | Caballero et al. |
| 8,584,945 B2 | 11/2013 | Wang et al. |
| 8,587,595 B2 | 11/2013 | Wang |
| 8,587,697 B2 | 11/2013 | Hussey et al. |
| 8,588,869 B2 | 11/2013 | Sauerwein et al. |
| 8,590,789 B2 | 11/2013 | Nahill et al. |
| 8,596,539 B2 | 12/2013 | Havens et al. |
| 8,596,542 B2 | 12/2013 | Havens et al. |
| 8,596,543 B2 | 12/2013 | Havens et al. |
| 8,599,271 B2 | 12/2013 | Havens et al. |
| 8,599,957 B2 | 12/2013 | Peake et al. |
| 8,600,158 B2 | 12/2013 | Li et al. |
| 8,600,167 B2 | 12/2013 | Showering |
| 8,602,309 B2 | 12/2013 | Longacre et al. |
| 8,608,053 B2 | 12/2013 | Meier et al. |
| 8,608,071 B2 | 12/2013 | Liu et al. |
| 8,611,309 B2 | 12/2013 | Wang et al. |
| 8,615,487 B2 | 12/2013 | Gomez et al. |
| 8,621,123 B2 | 12/2013 | Caballero |
| 8,622,303 B2 | 1/2014 | Meier et al. |
| 8,628,013 B2 | 1/2014 | Ding |
| 8,628,015 B2 | 1/2014 | Wang et al. |
| 8,628,016 B2 | 1/2014 | Winegar |
| 8,629,926 B2 | 1/2014 | Wang |
| 8,630,491 B2 | 1/2014 | Longacre et al. |
| 8,635,309 B2 | 1/2014 | Berthiaume et al. |
| 8,636,200 B2 | 1/2014 | Kearney |
| 8,636,212 B2 | 1/2014 | Nahill et al. |
| 8,636,215 B2 | 1/2014 | Ding et al. |
| 8,636,224 B2 | 1/2014 | Wang |
| 8,638,806 B2 | 1/2014 | Wang et al. |
| 8,640,958 B2 | 2/2014 | Lu et al. |
| 8,640,960 B2 | 2/2014 | Wang et al. |
| 8,643,717 B2 | 2/2014 | Li et al. |
| 8,646,692 B2 | 2/2014 | Meier et al. |
| 8,646,694 B2 | 2/2014 | Wang et al. |
| 8,657,200 B2 | 2/2014 | Ren et al. |
| 8,659,397 B2 | 2/2014 | Vargo et al. |
| 8,668,149 B2 | 3/2014 | Good |
| 8,678,285 B2 | 3/2014 | Kearney |
| 8,678,286 B2 | 3/2014 | Smith et al. |
| 8,682,077 B1 | 3/2014 | Longacre |
| D702,237 S | 4/2014 | Oberpriller et al. |
| 8,687,282 B2 | 4/2014 | Feng et al. |
| 8,692,927 B2 | 4/2014 | Pease et al. |
| 8,695,880 B2 | 4/2014 | Bremer et al. |
| 8,698,949 B2 | 4/2014 | Grunow et al. |
| 8,702,000 B2 | 4/2014 | Barber et al. |
| 8,717,494 B2 | 5/2014 | Gannon |
| 8,720,783 B2 | 5/2014 | Biss et al. |
| 8,723,804 B2 | 5/2014 | Fletcher et al. |
| 8,723,904 B2 | 5/2014 | Marty et al. |
| 8,727,223 B2 | 5/2014 | Wang |
| 8,740,082 B2 | 6/2014 | Wilz |
| 8,740,085 B2 | 6/2014 | Furlong et al. |
| 8,746,563 B2 | 6/2014 | Hennick et al. |
| 8,750,445 B2 | 6/2014 | Peake et al. |
| 8,752,766 B2 | 6/2014 | Xian et al. |
| 8,756,059 B2 | 6/2014 | Braho et al. |
| 8,757,495 B2 | 6/2014 | Qu et al. |
| 8,760,563 B2 | 6/2014 | Koziol et al. |
| 8,763,909 B2 | 7/2014 | Reed et al. |
| 8,777,108 B2 | 7/2014 | Coyle |
| 8,777,109 B2 | 7/2014 | Oberpriller et al. |
| 8,779,898 B2 | 7/2014 | Havens et al. |
| 8,781,520 B2 | 7/2014 | Payne et al. |
| 8,783,573 B2 | 7/2014 | Havens et al. |
| 8,789,757 B2 | 7/2014 | Barten |
| 8,789,758 B2 | 7/2014 | Hawley et al. |
| 8,789,759 B2 | 7/2014 | Xian et al. |
| 8,794,520 B2 | 8/2014 | Wang et al. |
| 8,794,522 B2 | 8/2014 | Ehrhart |
| 8,794,525 B2 | 8/2014 | Amundsen et al. |
| 8,794,526 B2 | 8/2014 | Wang et al. |
| 8,798,367 B2 | 8/2014 | Ellis |
| 8,807,431 B2 | 8/2014 | Wang et al. |
| 8,807,432 B2 | 8/2014 | Van Horn et al. |
| 8,820,630 B2 | 9/2014 | Qu et al. |
| 8,822,848 B2 | 9/2014 | Meagher |
| 8,824,692 B2 | 9/2014 | Sheerin et al. |
| 8,824,696 B2 | 9/2014 | Braho |
| 8,842,849 B2 | 9/2014 | Wahl et al. |
| 8,844,822 B2 | 9/2014 | Kotlarsky et al. |
| 8,844,823 B2 | 9/2014 | Fritz et al. |
| 8,849,019 B2 | 9/2014 | Li et al. |
| D716,285 S | 10/2014 | Chaney et al. |
| 8,851,383 B2 | 10/2014 | Yeakley et al. |
| 8,854,633 B2 | 10/2014 | Laffargue |
| 8,866,963 B2 | 10/2014 | Grunow et al. |
| 8,868,421 B2 | 10/2014 | Braho et al. |
| 8,868,519 B2 | 10/2014 | Maloy et al. |
| 8,868,802 B2 | 10/2014 | Barten |
| 8,868,803 B2 | 10/2014 | Caballero |
| 8,870,074 B1 | 10/2014 | Gannon |
| 8,879,639 B2 | 11/2014 | Sauerwein |
| 8,880,426 B2 | 11/2014 | Smith |
| 8,881,983 B2 | 11/2014 | Havens et al. |
| 8,881,987 B2 | 11/2014 | Wang |
| 8,903,172 B2 | 12/2014 | Smith |
| 8,908,995 B2 | 12/2014 | Benos et al. |
| 8,910,870 B2 | 12/2014 | Li et al. |
| 8,910,875 B2 | 12/2014 | Ren et al. |
| 8,914,290 B2 | 12/2014 | Hendrickson et al. |
| 8,914,788 B2 | 12/2014 | Pettinelli et al. |
| 8,915,439 B2 | 12/2014 | Feng et al. |
| 8,915,444 B2 | 12/2014 | Havens et al. |
| 8,916,789 B2 | 12/2014 | Woodburn |
| 8,918,250 B2 | 12/2014 | Hollifield |
| 8,918,564 B2 | 12/2014 | Caballero |
| 8,925,818 B2 | 1/2015 | Kosecki et al. |
| 8,939,374 B2 | 1/2015 | Jovanovski et al. |
| 8,942,480 B2 | 1/2015 | Ellis |
| 8,944,313 B2 | 2/2015 | Williams et al. |
| 8,944,327 B2 | 2/2015 | Meier et al. |
| 8,944,332 B2 | 2/2015 | Harding et al. |
| 8,950,678 B2 | 2/2015 | Germaine et al. |
| D723,560 S | 3/2015 | Zhou et al. |

(56) References Cited

U.S. PATENT DOCUMENTS

| | | |
|---|---|---|
| 8,967,468 B2 | 3/2015 | Gomez et al. |
| 8,971,346 B2 | 3/2015 | Sevier |
| 8,976,030 B2 | 3/2015 | Cunningham et al. |
| 8,976,368 B2 | 3/2015 | Akel et al. |
| 8,978,981 B2 | 3/2015 | Guan |
| 8,978,983 B2 | 3/2015 | Bremer et al. |
| 8,978,984 B2 | 3/2015 | Hennick et al. |
| 8,985,456 B2 | 3/2015 | Zhu et al. |
| 8,985,457 B2 | 3/2015 | Soule et al. |
| 8,985,459 B2 | 3/2015 | Kearney et al. |
| 8,985,461 B2 | 3/2015 | Gelay et al. |
| 8,988,578 B2 | 3/2015 | Showering |
| 8,988,590 B2 | 3/2015 | Gillet et al. |
| 8,991,704 B2 | 3/2015 | Hopper et al. |
| 8,996,194 B2 | 3/2015 | Davis et al. |
| 8,996,384 B2 | 3/2015 | Funyak et al. |
| 8,998,091 B2 | 4/2015 | Edmonds et al. |
| 9,002,641 B2 | 4/2015 | Showering |
| 9,007,368 B2 | 4/2015 | Laffargue et al. |
| 9,010,641 B2 | 4/2015 | Qu et al. |
| 9,015,513 B2 | 4/2015 | Murawski et al. |
| 9,016,576 B2 | 4/2015 | Brady et al. |
| D730,357 S | 5/2015 | Fitch et al. |
| 9,022,288 B2 | 5/2015 | Nahill et al. |
| 9,030,964 B2 | 5/2015 | Essinger et al. |
| 9,033,240 B2 | 5/2015 | Smith et al. |
| 9,033,242 B2 | 5/2015 | Gillet et al. |
| 9,036,054 B2 | 5/2015 | Koziol et al. |
| 9,037,344 B2 | 5/2015 | Chamberlin |
| 9,038,911 B2 | 5/2015 | Xian et al. |
| 9,038,915 B2 | 5/2015 | Smith |
| D730,901 S | 6/2015 | Oberpriller et al. |
| D730,902 S | 6/2015 | Fitch et al. |
| 9,047,098 B2 | 6/2015 | Barten |
| 9,047,359 B2 | 6/2015 | Caballero et al. |
| 9,047,420 B2 | 6/2015 | Caballero |
| 9,047,525 B2 | 6/2015 | Barber |
| 9,047,531 B2 | 6/2015 | Showering et al. |
| 9,049,640 B2 | 6/2015 | Wang et al. |
| 9,053,055 B2 | 6/2015 | Caballero |
| 9,053,378 B1 | 6/2015 | Hou et al. |
| 9,053,380 B2 | 6/2015 | Xian et al. |
| 9,057,641 B2 | 6/2015 | Amundsen et al. |
| 9,058,526 B2 | 6/2015 | Powilleit |
| 9,061,527 B2 | 6/2015 | Tobin et al. |
| 9,064,165 B2 | 6/2015 | Havens et al. |
| 9,064,167 B2 | 6/2015 | Xian et al. |
| 9,064,168 B2 | 6/2015 | Todeschini et al. |
| 9,064,254 B2 | 6/2015 | Todeschini et al. |
| 9,066,032 B2 | 6/2015 | Wang |
| 9,070,032 B2 | 6/2015 | Corcoran |
| D734,339 S | 7/2015 | Zhou et al. |
| D734,751 S | 7/2015 | Oberpriller et al. |
| 9,076,459 B2 | 7/2015 | Braho et al. |
| 9,079,423 B2 | 7/2015 | Bouverie et al. |
| 9,080,856 B2 | 7/2015 | Laffargue |
| 9,082,023 B2 | 7/2015 | Feng et al. |
| 9,084,032 B2 | 7/2015 | Rautiola et al. |
| 9,087,250 B2 | 7/2015 | Coyle |
| 9,092,681 B2 | 7/2015 | Havens et al. |
| 9,092,682 B2 | 7/2015 | Wilz et al. |
| 9,092,683 B2 | 7/2015 | Koziol et al. |
| 9,093,141 B2 | 7/2015 | Liu |
| 9,098,763 B2 | 8/2015 | Lu et al. |
| 9,104,929 B2 | 8/2015 | Todeschini |
| 9,104,934 B2 | 8/2015 | Li et al. |
| 9,107,484 B2 | 8/2015 | Chaney |
| 9,111,159 B2 | 8/2015 | Liu et al. |
| 9,111,166 B2 | 8/2015 | Cunningham |
| 9,135,483 B2 | 9/2015 | Liu et al. |
| 9,137,009 B1 | 9/2015 | Gardiner |
| 9,141,839 B2 | 9/2015 | Xian et al. |
| 9,147,096 B2 | 9/2015 | Wang |
| 9,148,474 B2 | 9/2015 | Skvoretz |
| 9,158,000 B2 | 10/2015 | Sauerwein |
| 9,158,340 B2 | 10/2015 | Reed et al. |
| 9,158,953 B2 | 10/2015 | Gillet et al. |
| 9,159,059 B2 | 10/2015 | Daddabbo et al. |
| 9,165,174 B2 | 10/2015 | Huck |
| 9,171,543 B2 | 10/2015 | Emerick et al. |
| 9,183,425 B2 | 11/2015 | Wang |
| 9,189,669 B2 | 11/2015 | Zhu et al. |
| 9,195,844 B2 | 11/2015 | Todeschini et al. |
| 9,202,458 B2 | 12/2015 | Braho et al. |
| 9,208,366 B2 | 12/2015 | Liu |
| 9,208,367 B2 | 12/2015 | Wang |
| 9,219,836 B2 | 12/2015 | Bouverie et al. |
| 9,224,022 B2 | 12/2015 | Ackley et al. |
| 9,224,024 B2 | 12/2015 | Bremer et al. |
| 9,224,027 B2 | 12/2015 | Van Horn et al. |
| D747,321 S | 1/2016 | London et al. |
| 9,230,140 B1 | 1/2016 | Ackley |
| 9,235,553 B2 | 1/2016 | Fitch et al. |
| 9,239,950 B2 | 1/2016 | Fletcher |
| 9,245,492 B2 | 1/2016 | Ackley et al. |
| 9,443,123 B2 | 1/2016 | Hejl |
| 9,248,640 B2 | 2/2016 | Heng |
| 9,250,652 B2 | 2/2016 | London et al. |
| 9,250,712 B1 | 2/2016 | Todeschini |
| 9,251,411 B2 | 2/2016 | Todeschini |
| 9,258,033 B2 | 2/2016 | Showering |
| 9,262,633 B1 | 2/2016 | Todeschini et al. |
| 9,262,660 B2 | 2/2016 | Lu et al. |
| 9,262,662 B2 | 2/2016 | Chen et al. |
| 9,269,036 B2 | 2/2016 | Bremer |
| 9,270,782 B2 | 2/2016 | Hala et al. |
| 9,274,812 B2 | 3/2016 | Doren et al. |
| 9,275,388 B2 | 3/2016 | Havens et al. |
| 9,277,668 B2 | 3/2016 | Feng et al. |
| 9,280,693 B2 | 3/2016 | Feng et al. |
| 9,286,496 B2 | 3/2016 | Smith |
| 9,297,900 B2 | 3/2016 | Jiang |
| 9,298,964 B2 | 3/2016 | Li et al. |
| 9,301,427 B2 | 3/2016 | Feng et al. |
| 9,304,376 B2 | 4/2016 | Anderson |
| 9,310,609 B2 | 4/2016 | Rueblinger et al. |
| 9,313,377 B2 | 4/2016 | Todeschini et al. |
| 9,317,037 B2 | 4/2016 | Byford et al. |
| D757,009 S | 5/2016 | Oberpriller et al. |
| 9,342,723 B2 | 5/2016 | Liu et al. |
| 9,342,724 B2 | 5/2016 | McCloskey |
| 9,361,882 B2 | 6/2016 | Ressler et al. |
| 9,365,381 B2 | 6/2016 | Colonel et al. |
| 9,367,779 B2 | 6/2016 | Kitamura et al. |
| 9,373,018 B2 | 6/2016 | Colavito et al. |
| 9,375,945 B1 | 6/2016 | Bowles |
| 9,378,403 B2 | 6/2016 | Wang et al. |
| D760,719 S | 7/2016 | Zhou et al. |
| 9,360,304 B2 | 7/2016 | Chang et al. |
| 9,383,848 B2 | 7/2016 | Daghigh |
| 9,384,374 B2 | 7/2016 | Bianconi |
| 9,390,596 B2 | 7/2016 | Todeschini |
| D762,604 S | 8/2016 | Fitch et al. |
| 9,411,386 B2 | 8/2016 | Sauerwein |
| 9,412,242 B2 | 8/2016 | Van Horn et al. |
| 9,418,269 B2 | 8/2016 | Havens et al. |
| 9,418,270 B2 | 8/2016 | Van Volkinburg et al. |
| 9,423,318 B2 | 8/2016 | Lui et al. |
| D766,244 S | 9/2016 | Zhou et al. |
| 9,443,222 B2 | 9/2016 | Singel et al. |
| 9,454,689 B2 | 9/2016 | McCloskey et al. |
| 9,464,885 B2 | 10/2016 | Lloyd et al. |
| 9,465,967 B2 | 10/2016 | Xian et al. |
| 9,478,113 B2 | 10/2016 | Xie et al. |
| 9,478,983 B2 | 10/2016 | Kather et al. |
| D771,631 S | 11/2016 | Fitch et al. |
| 9,481,186 B2 | 11/2016 | Bouverie et al. |
| 9,488,986 B1 | 11/2016 | Solanki |
| 9,489,782 B2 | 11/2016 | Payne et al. |
| 9,490,540 B1 | 11/2016 | Davies et al. |
| 9,491,729 B2 | 11/2016 | Rautiola et al. |
| 9,497,092 B2 | 11/2016 | Gomez et al. |
| 9,507,974 B1 | 11/2016 | Todeschini |
| 9,519,814 B2 | 12/2016 | Cudzilo |

(56) References Cited

U.S. PATENT DOCUMENTS

| | | |
|---|---|---|
| 9,521,331 B2 | 12/2016 | Bessettes et al. |
| 9,530,038 B2 | 12/2016 | Xian et al. |
| D777,166 S | 1/2017 | Bidwell et al. |
| 9,558,386 B2 | 1/2017 | Yeakley |
| 9,572,901 B2 | 2/2017 | Todeschini |
| 9,606,581 B1 | 3/2017 | Howe et al. |
| D783,601 S | 4/2017 | Schulte et al. |
| D785,617 S | 5/2017 | Bidwell et al. |
| D785,636 S | 5/2017 | Oberpriller et al. |
| 9,646,189 B2 | 5/2017 | Lu et al. |
| 9,646,191 B2 | 5/2017 | Unemyr et al. |
| 9,652,648 B2 | 5/2017 | Ackley et al. |
| 9,652,653 B2 | 5/2017 | Todeschini et al. |
| 9,656,487 B2 | 5/2017 | Ho et al. |
| 9,659,198 B2 | 5/2017 | Giordano et al. |
| D790,505 S | 6/2017 | Vargo et al. |
| D790,546 S | 6/2017 | Zhou et al. |
| 9,680,282 B2 | 6/2017 | Hanenburg |
| 9,697,401 B2 | 7/2017 | Feng et al. |
| 9,701,140 B1 | 7/2017 | Alaganchetty et al. |
| 2001/0037462 A1 | 11/2001 | Bengston |
| 2004/0008842 A1* | 1/2004 | Partelow .............. G06F 3/1222 380/51 |
| 2007/0063048 A1 | 3/2007 | Havens et al. |
| 2009/0134221 A1 | 5/2009 | Zhu et al. |
| 2010/0177076 A1 | 7/2010 | Essinger et al. |
| 2010/0177080 A1 | 7/2010 | Essinger et al. |
| 2010/0177707 A1 | 7/2010 | Essinger et al. |
| 2010/0177749 A1 | 7/2010 | Essinger et al. |
| 2011/0169999 A1 | 7/2011 | Grunow et al. |
| 2011/0202554 A1 | 8/2011 | Powilleit et al. |
| 2012/0111946 A1 | 5/2012 | Golant |
| 2012/0168512 A1 | 7/2012 | Kotlarsky et al. |
| 2012/0193423 A1 | 8/2012 | Samek |
| 2012/0203647 A1 | 8/2012 | Smith |
| 2012/0223141 A1 | 9/2012 | Good et al. |
| 2013/0043312 A1 | 2/2013 | Van Horn |
| 2013/0075168 A1 | 3/2013 | Amundsen et al. |
| 2013/0175341 A1 | 7/2013 | Kearney et al. |
| 2013/0175343 A1 | 7/2013 | Good |
| 2013/0257744 A1 | 10/2013 | Daghigh et al. |
| 2013/0257759 A1 | 10/2013 | Daghigh |
| 2013/0270346 A1 | 10/2013 | Xian et al. |
| 2013/0292475 A1 | 11/2013 | Kotlarsky et al. |
| 2013/0292477 A1 | 11/2013 | Hennick et al. |
| 2013/0293539 A1 | 11/2013 | Hunt et al. |
| 2013/0293540 A1 | 11/2013 | Laffargue et al. |
| 2013/0306728 A1 | 11/2013 | Thuries et al. |
| 2013/0306731 A1 | 11/2013 | Pedraro |
| 2013/0307964 A1 | 11/2013 | Bremer et al. |
| 2013/0308625 A1 | 11/2013 | Park et al. |
| 2013/0313324 A1 | 11/2013 | Koziol et al. |
| 2013/0332524 A1 | 12/2013 | Fiala et al. |
| 2014/0001267 A1 | 1/2014 | Giordano et al. |
| 2014/0002828 A1 | 1/2014 | Laffargue et al. |
| 2014/0025584 A1 | 1/2014 | Liu et al. |
| 2014/0100813 A1 | 1/2014 | Showering |
| 2014/0034734 A1 | 2/2014 | Sauerwein |
| 2014/0036304 A1* | 2/2014 | Takasu .............. G06F 3/12 358/1.15 |
| 2014/0039693 A1 | 2/2014 | Havens et al. |
| 2014/0049120 A1 | 2/2014 | Kohtz et al. |
| 2014/0049635 A1 | 2/2014 | Laffargue et al. |
| 2014/0061306 A1 | 3/2014 | Wu et al. |
| 2014/0063289 A1 | 3/2014 | Hussey et al. |
| 2014/0066136 A1 | 3/2014 | Sauerwein et al. |
| 2014/0067692 A1 | 3/2014 | Ye et al. |
| 2014/0070005 A1 | 3/2014 | Nahill et al. |
| 2014/0071840 A1 | 3/2014 | Venancio |
| 2014/0074746 A1 | 3/2014 | Wang |
| 2014/0076974 A1 | 3/2014 | Havens et al. |
| 2014/0078342 A1 | 3/2014 | Li et al. |
| 2014/0098792 A1 | 4/2014 | Wang et al. |
| 2014/0100774 A1 | 4/2014 | Showering |
| 2014/0103115 A1 | 4/2014 | Meier et al. |
| 2014/0104413 A1 | 4/2014 | McCloskey et al. |
| 2014/0104414 A1 | 4/2014 | McCloskey et al. |
| 2014/0104416 A1 | 4/2014 | Giordano et al. |
| 2014/0106725 A1 | 4/2014 | Sauerwein |
| 2014/0108010 A1 | 4/2014 | Maltseff et al. |
| 2014/0108402 A1 | 4/2014 | Gomez et al. |
| 2014/0108682 A1 | 4/2014 | Caballero |
| 2014/0110485 A1 | 4/2014 | Toa et al. |
| 2014/0114530 A1 | 4/2014 | Fitch et al. |
| 2014/0125853 A1 | 5/2014 | Wang |
| 2014/0125999 A1 | 5/2014 | Longacre et al. |
| 2014/0129378 A1 | 5/2014 | Richardson |
| 2014/0131443 A1 | 5/2014 | Smith |
| 2014/0131444 A1 | 5/2014 | Wang |
| 2014/0133379 A1 | 5/2014 | Wang et al. |
| 2014/0136208 A1 | 5/2014 | Maltseff et al. |
| 2014/0140585 A1 | 5/2014 | Wang |
| 2014/0152882 A1 | 6/2014 | Samek et al. |
| 2014/0158770 A1 | 6/2014 | Sevier et al. |
| 2014/0159869 A1 | 6/2014 | Zumsteg et al. |
| 2014/0166755 A1 | 6/2014 | Liu et al. |
| 2014/0166757 A1 | 6/2014 | Smith |
| 2014/0168787 A1 | 6/2014 | Wang et al. |
| 2014/0175165 A1 | 6/2014 | Havens et al. |
| 2014/0191913 A1 | 7/2014 | Ge et al. |
| 2014/0197239 A1 | 7/2014 | Havens et al. |
| 2014/0197304 A1 | 7/2014 | Feng et al. |
| 2014/0204268 A1 | 7/2014 | Grunow et al. |
| 2014/0214631 A1 | 7/2014 | Hansen |
| 2014/0217166 A1 | 8/2014 | Berthiaume et al. |
| 2014/0217180 A1 | 8/2014 | Liu |
| 2014/0231500 A1 | 8/2014 | Ehrhart et al. |
| 2014/0247315 A1 | 9/2014 | Marty et al. |
| 2014/0263493 A1 | 9/2014 | Amurgis et al. |
| 2014/0263645 A1 | 9/2014 | Smith et al. |
| 2014/0270196 A1 | 9/2014 | Braho et al. |
| 2014/0270229 A1 | 9/2014 | Braho |
| 2014/0278387 A1 | 9/2014 | DiGregorio |
| 2014/0282210 A1 | 9/2014 | Bianconi |
| 2014/0288933 A1 | 9/2014 | Braho et al. |
| 2014/0297058 A1 | 10/2014 | Barker et al. |
| 2014/0299665 A1 | 10/2014 | Barber et al. |
| 2014/0351317 A1 | 11/2014 | Smith et al. |
| 2014/0362184 A1 | 12/2014 | Jovanovski et al. |
| 2014/0363015 A1 | 12/2014 | Braho |
| 2014/0369511 A1 | 12/2014 | Sheerin et al. |
| 2014/0374483 A1 | 12/2014 | Lu |
| 2014/0374485 A1 | 12/2014 | Xian et al. |
| 2015/0001301 A1 | 1/2015 | Ouyang |
| 2015/0009338 A1 | 1/2015 | Laffargue et al. |
| 2015/0014416 A1 | 1/2015 | Kotlarsky et al. |
| 2015/0021397 A1 | 1/2015 | Rueblinger et al. |
| 2015/0028104 A1 | 1/2015 | Ma et al. |
| 2015/0029002 A1 | 1/2015 | Yeakley et al. |
| 2015/0032709 A1 | 1/2015 | Maloy et al. |
| 2015/0039309 A1 | 2/2015 | Braho et al. |
| 2015/0040378 A1 | 2/2015 | Saber et al. |
| 2015/0049347 A1 | 2/2015 | Laffargue et al. |
| 2015/0051992 A1 | 2/2015 | Smith |
| 2015/0053769 A1 | 2/2015 | Thuries et al. |
| 2015/0062366 A1 | 3/2015 | Liu et al. |
| 2015/0063215 A1 | 3/2015 | Wang |
| 2015/0088522 A1 | 3/2015 | Hendrickson et al. |
| 2015/0096872 A1 | 4/2015 | Woodburn |
| 2015/0100196 A1 | 4/2015 | Hollifield |
| 2015/0115035 A1 | 4/2015 | Meier et al. |
| 2015/0127791 A1 | 5/2015 | Kosecki et al. |
| 2015/0128116 A1 | 5/2015 | Chen et al. |
| 2015/0133047 A1 | 5/2015 | Smith et al. |
| 2015/0134470 A1 | 5/2015 | Hejl et al. |
| 2015/0136851 A1 | 5/2015 | Harding et al. |
| 2015/0142492 A1 | 5/2015 | Kumar |
| 2015/0144692 A1 | 5/2015 | Hejl |
| 2015/0144698 A1 | 5/2015 | Teng et al. |
| 2015/0149946 A1 | 5/2015 | Benos et al. |
| 2015/0161429 A1 | 6/2015 | Xian |
| 2015/0186703 A1 | 7/2015 | Chen et al. |
| 2015/0199957 A1 | 7/2015 | Funyak et al. |
| 2015/0210199 A1 | 7/2015 | Payne |

(56) References Cited

U.S. PATENT DOCUMENTS

| | | |
|---|---|---|
| 2015/0220753 A1 | 8/2015 | Zhu et al. |
| 2015/0254485 A1 | 9/2015 | Feng et al. |
| 2015/0310243 A1 | 10/2015 | Ackley |
| 2015/0310389 A1 | 10/2015 | Crimm et al. |
| 2015/0327012 A1 | 11/2015 | Bian et al. |
| 2016/0014251 A1 | 1/2016 | Hejl |
| 2016/0040982 A1 | 2/2016 | Li et al. |
| 2016/0042241 A1 | 2/2016 | Todeschini |
| 2016/0057230 A1 | 2/2016 | Todeschini et al. |
| 2016/0062473 A1 | 3/2016 | Bouchat et al. |
| 2016/0092805 A1 | 3/2016 | Geisler et al. |
| 2016/0101936 A1 | 4/2016 | Chamberlin |
| 2016/0102975 A1 | 4/2016 | McCloskey et al. |
| 2016/0104019 A1 | 4/2016 | Todeschini et al. |
| 2016/0104274 A1 | 4/2016 | Jovanovski et al. |
| 2016/0109219 A1 | 4/2016 | Ackley et al. |
| 2016/0109220 A1 | 4/2016 | Laffargue |
| 2016/0109224 A1 | 4/2016 | Thuries et al. |
| 2016/0112631 A1 | 4/2016 | Ackley et al. |
| 2016/0112643 A1 | 4/2016 | Laffargue et al. |
| 2016/0117627 A1 | 4/2016 | Raj et al. |
| 2016/0124516 A1 | 5/2016 | Schoon et al. |
| 2016/0125217 A1 | 5/2016 | Todeschini |
| 2016/0125342 A1 | 5/2016 | Miller et al. |
| 2016/0133253 A1 | 5/2016 | Braho et al. |
| 2016/0171597 A1 | 6/2016 | Todeschini |
| 2016/0171666 A1 | 6/2016 | McCloskey |
| 2016/0171720 A1 | 6/2016 | Todeschini |
| 2016/0171775 A1 | 6/2016 | Todeschini et al. |
| 2016/0171777 A1 | 6/2016 | Todeschini et al. |
| 2016/0174674 A1 | 6/2016 | Oberpriller et al. |
| 2016/0178479 A1 | 6/2016 | Goldsmith |
| 2016/0178685 A1 | 6/2016 | Young et al. |
| 2016/0178707 A1 | 6/2016 | Young et al. |
| 2016/0179132 A1 | 6/2016 | Harr et al. |
| 2016/0179143 A1 | 6/2016 | Bidwell et al. |
| 2016/0179368 A1 | 6/2016 | Roeder |
| 2016/0179378 A1 | 6/2016 | Kent et al. |
| 2016/0180130 A1 | 6/2016 | Bremer |
| 2016/0180133 A1 | 6/2016 | Oberpriller et al. |
| 2016/0180136 A1 | 6/2016 | Meier et al. |
| 2016/0180594 A1 | 6/2016 | Todeschini |
| 2016/0180663 A1 | 6/2016 | McMahan et al. |
| 2016/0180678 A1 | 6/2016 | Ackley et al. |
| 2016/0180713 A1 | 6/2016 | Bernhardt et al. |
| 2016/0185136 A1 | 6/2016 | Ng et al. |
| 2016/0185291 A1 | 6/2016 | Chamberlin |
| 2016/0186926 A1 | 6/2016 | Oberpriller et al. |
| 2016/0188861 A1 | 6/2016 | Todeschini |
| 2016/0188939 A1 | 6/2016 | Sailors et al. |
| 2016/0188940 A1 | 6/2016 | Lu et al. |
| 2016/0188941 A1 | 6/2016 | Todeschini et al. |
| 2016/0188942 A1 | 6/2016 | Good et al. |
| 2016/0188943 A1 | 6/2016 | Linwood |
| 2016/0188944 A1 | 6/2016 | Wilz et al. |
| 2016/0189076 A1 | 6/2016 | Mellott et al. |
| 2016/0189087 A1 | 6/2016 | Morton et al. |
| 2016/0189088 A1 | 6/2016 | Pecorari et al. |
| 2016/0189092 A1 | 6/2016 | George et al. |
| 2016/0189284 A1 | 6/2016 | Mellott et al. |
| 2016/0189288 A1 | 6/2016 | Todeschini |
| 2016/0189366 A1 | 6/2016 | Chamberlin et al. |
| 2016/0189443 A1 | 6/2016 | Smith |
| 2016/0189447 A1 | 6/2016 | Valenzuela |
| 2016/0189489 A1 | 6/2016 | Au et al. |
| 2016/0191684 A1 | 6/2016 | DiPiazza et al. |
| 2016/0192051 A1 | 6/2016 | DiPiazza et al. |
| 2016/0125873 A1 | 7/2016 | Braho et al. |
| 2016/0202951 A1 | 7/2016 | Pike et al. |
| 2016/0202958 A1 | 7/2016 | Zabel et al. |
| 2016/0202959 A1 | 7/2016 | Doubleday et al. |
| 2016/0203021 A1 | 7/2016 | Pike et al. |
| 2016/0203429 A1 | 7/2016 | Mellott et al. |
| 2016/0203797 A1 | 7/2016 | Pike et al. |
| 2016/0203820 A1 | 7/2016 | Zabel et al. |
| 2016/0204623 A1 | 7/2016 | Haggert et al. |
| 2016/0204636 A1 | 7/2016 | Allen et al. |
| 2016/0204638 A1 | 7/2016 | Miraglia et al. |
| 2016/0316190 A1 | 7/2016 | McCloskey et al. |
| 2016/0227912 A1 | 8/2016 | Oberpriller et al. |
| 2016/0232891 A1 | 8/2016 | Pecorari |
| 2016/0292477 A1 | 10/2016 | Bidwell |
| 2016/0294779 A1 | 10/2016 | Yeakley et al. |
| 2016/0306769 A1 | 10/2016 | Kohtz et al. |
| 2016/0314276 A1 | 10/2016 | Sewell et al. |
| 2016/0314294 A1 | 10/2016 | Kubler et al. |
| 2016/0323310 A1 | 11/2016 | Todeschini et al. |
| 2016/0325677 A1 | 11/2016 | Fitch et al. |
| 2016/0327614 A1 | 11/2016 | Young et al. |
| 2016/0327930 A1 | 11/2016 | Charpentier et al. |
| 2016/0328762 A1 | 11/2016 | Pape |
| 2016/0330218 A1 | 11/2016 | Hussey et al. |
| 2016/0343163 A1 | 11/2016 | Venkatesha et al. |
| 2016/0343176 A1 | 11/2016 | Ackley |
| 2016/0364914 A1 | 12/2016 | Todeschini |
| 2016/0370220 A1 | 12/2016 | Ackley et al. |
| 2016/0372282 A1 | 12/2016 | Bandringa |
| 2016/0373847 A1 | 12/2016 | Vargo et al. |
| 2016/0377414 A1 | 12/2016 | Thuries et al. |
| 2016/0377417 A1 | 12/2016 | Jovanovski et al. |
| 2017/0010141 A1 | 1/2017 | Ackley |
| 2017/0010328 A1 | 1/2017 | Mullen et al. |
| 2017/0010780 A1 | 1/2017 | Waldron et al. |
| 2017/0016714 A1 | 1/2017 | Laffargue et al. |
| 2017/0018094 A1 | 1/2017 | Todeschini |
| 2017/0046603 A1 | 2/2017 | Lee et al. |
| 2017/0047864 A1 | 2/2017 | Stang et al. |
| 2017/0053146 A1 | 2/2017 | Liu et al. |
| 2017/0053147 A1 | 2/2017 | Geramine et al. |
| 2017/0053647 A1 | 2/2017 | Nichols et al. |
| 2017/0055606 A1 | 3/2017 | Xu et al. |
| 2017/0060316 A1 | 3/2017 | Larson |
| 2017/0061961 A1 | 3/2017 | Nichols et al. |
| 2017/0064634 A1 | 3/2017 | Van Horn et al. |
| 2017/0083730 A1 | 3/2017 | Feng et al. |
| 2017/0091502 A1 | 3/2017 | Furlong et al. |
| 2017/0091706 A1 | 3/2017 | Lloyd et al. |
| 2017/0091741 A1 | 3/2017 | Todeschini |
| 2017/0091904 A1 | 3/2017 | Ventress |
| 2017/0092908 A1 | 3/2017 | Chaney |
| 2017/0094238 A1 | 3/2017 | Germaine et al. |
| 2017/0098947 A1 | 4/2017 | Wolski |
| 2017/0100949 A1 | 4/2017 | Celinder et al. |
| 2017/0108838 A1 | 4/2017 | Todeschini et al. |
| 2017/0108895 A1 | 4/2017 | Chamberlin et al. |
| 2017/0118355 A1 | 4/2017 | Wong et al. |
| 2017/0123598 A1 | 5/2017 | Phan et al. |
| 2017/0124369 A1 | 5/2017 | Rueblinger et al. |
| 2017/0124396 A1 | 5/2017 | Todeschini et al. |
| 2017/0124687 A1 | 5/2017 | McCloskey et al. |
| 2017/0126873 A1 | 5/2017 | McGary et al. |
| 2017/0126904 A1 | 5/2017 | d'Armancourt et al. |
| 2017/0139012 A1 | 5/2017 | Smith |
| 2017/0140329 A1 | 5/2017 | Bernhardt et al. |
| 2017/0140731 A1 | 5/2017 | Smith |
| 2017/0147847 A1 | 5/2017 | Berggren et al. |
| 2017/0150124 A1 | 5/2017 | Thuries |
| 2017/0169198 A1 | 6/2017 | Nichols |
| 2017/0171035 A1 | 6/2017 | Lu et al. |
| 2017/0171703 A1 | 6/2017 | Maheswaranathan |
| 2017/0171803 A1 | 6/2017 | Maheswaranathan |
| 2017/0180359 A1 | 6/2017 | Wolski et al. |
| 2017/0180577 A1 | 6/2017 | Nguon et al. |
| 2017/0181299 A1 | 6/2017 | Shi et al. |
| 2017/0190192 A1 | 7/2017 | Delario et al. |
| 2017/0193432 A1 | 7/2017 | Bernhardt |
| 2017/0193461 A1 | 7/2017 | Jonas et al. |
| 2017/0193727 A1 | 7/2017 | Van Horn et al. |
| 2017/0200108 A1 | 7/2017 | Au et al. |
| 2017/0200275 A1 | 7/2017 | McCloskey et al. |

\* cited by examiner

100

FIG. 2 Exemplary Printing Elements

400

FIG. 5  Device-Internal Data Encryption
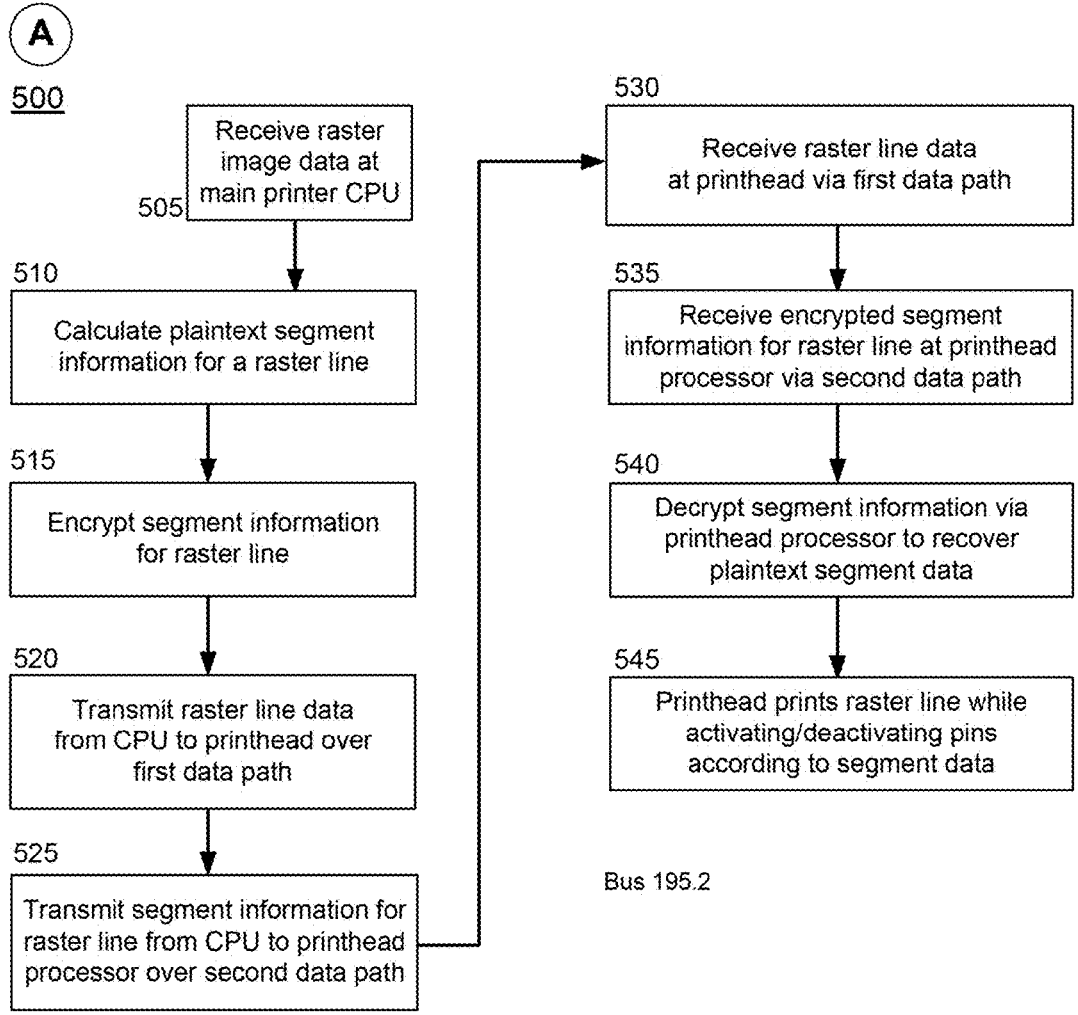
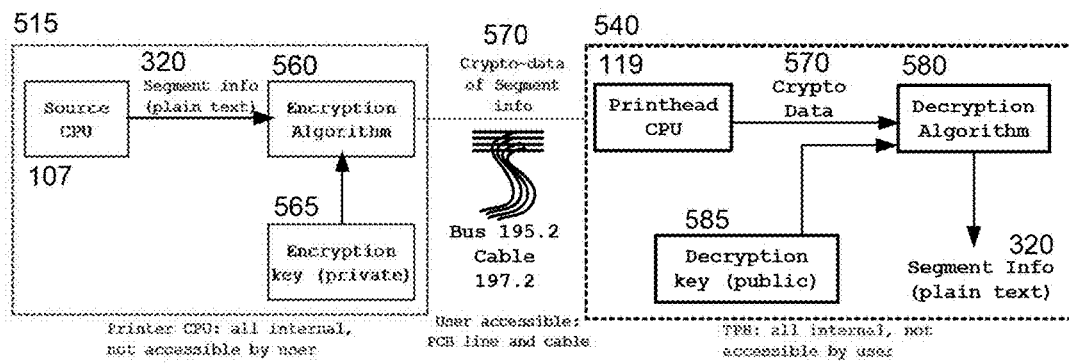

CRYPTOGRAPHIC PRINTHEAD

FIELD OF THE INVENTION

The present invention relates to systems for printing, such as printers, which print onto a print media such as labels. More specifically, the invention relates to maintaining internal data security within a printer, where the security protects such printing control information as may be sent from the printer's processor to the printer's printhead.

BACKGROUND

Generally speaking, data security is a well-known concern in the digital and processing arts. For example, it is often necessary to send information between two parties, where the information is intended to be private even if the data transmission is intercepted by a third party. Numerous encryption systems and methods, as well as other security methods, are well-known for maintaining the security of data transmitted over networks.

However, there exists a requirement for another form of secure data transmission, namely, the transmission of data which is internal within a single digital device. For example, a need may exist for digital security for data transmitted internally between component elements (such as between two separate microchips, connected over an internal bus) of a computer, a cell phone, a printer, or other digital device.

The need for internal device security may present itself for multiple reasons. In general, however, it is possible for third-parties to physically open a digital device (such as a computer, printer, cell phone, etc.), and to use physical means (that is, wired, conductor-to-conductor contact means) to monitor communications over an internal device bus. This is conventionally referred to as "tapping." For example, physical connection may be made to the bus pathways on a circuit board, or physical connection may be made directly to the pins on microchips. With such third-party tapping, a signal internal to a device can be monitored and potentially interpreted. In some cases, it may also be possible to "snoop" on an internal device signal via wireless means (for example, when communications over an internal device bus is made wirelessly within the device).

Tapping/snooping into an internal device signal, by monitoring a device bus or chip, in turn can pose several security problems. One security problem may be the interception of raw, unencoded data (for example, plain ASCII text of a message) which is meant to be secure from the outside world.

Another device-internal security problem also presents itself. A digital device may employ various algorithms and methods to optimize internal performance. These algorithms may entail or include optimizations to the way data is transmitted, encoded, timed, or otherwise parsed internally within the device.

For example, a computer may employ various internal data transmissions algorithms to optimize memory access between the microprocessor (CPU) and memory, or may optimize bus access between the CPU and other system elements; a transceiver may employ various internal data transmissions algorithms (such as MIMO algorithms for multi-antenna devices) to optimize the strength of data transmission and reception; or a printer may employ specialized internal data transmission algorithms to optimize print quality.

The internal operations algorithms of a digital device, including but not limited to optimization algorithms, may be proprietary in nature (for example, not subject to public disclosure). For these and other reasons, it may be desirable to keep the nature of the internal optimizations a secret from third-party device manufacturers.

However, a third-party manufacturer may be able to tap or snoop an internal device signal; and based on the tapped/snooped data detected, the third party may be able to reverse-engineer internal optimization algorithms which are themselves intended to be secure and proprietary.

What is needed then is a system and method for secure data transmission internal to a digital device. In one particular application, for example, what is needed is a system and method to ensure the security of print optimization algorithms internal to a printing device.

SUMMARY

Accordingly, in one aspect, the present system and method embraces processing hardware. In an exemplary embodiment, the present invention embraces a digital device with at least two processors. One of the processors may be a first or main processor of the device. The second processor may be particularly associated with and structurally integrated into an operational element of the device, such as a printhead, a transceiver, or a memory management chip.

The first or main processor may calculate one or more optimization parameters or optimization control signals for the operational element. The first processor may also encrypt the optimization parameters/control signals.

The encrypted optimization parameters/control signals are transmitted internally to the operational element of the device. At the operational element, the associated secondary processor decrypts the parameters or control signals. The operational elements then performs it function(s) (such as printing, transceiving, or memory management) in accordance with the decrypted optimization parameters/control signals.

In a second exemplary embodiment, the present invention embraces a printer with at least two processors. One of the processors may be a first or main processor of the printer. The second processor may be particularly associated with and structurally integrated into a printhead of the printer.

The first or main processor may calculate one or more optimization parameters or optimization control signals for the printhead. For example, for a thermal printer, the main processor may calculate timing signals which determine an on-period and an off-period for heat generated by a thermal printer. The first processor may also encrypt the printing optimization parameters/control signals.

The encrypted optimization parameters/control signals are transmitted internally to the printhead of the printer. At the printhead, an associated, integrated secondary processor decrypts the parameters or control signals, such as the timing signals. The printhead then prints, generating or not generating heat in accordance with the decrypted optimization parameters/control signals which determine optimized on/off intervals for heat generation.

In another aspect, the present invention embraces methods which may be implemented in a processing device by hardware controlled by suitable software or firmware.

In one exemplary embodiment, the present invention embraces a method to be performed by a digital device with at least two processors. One of the processors may be a first or main processor of the device. The second processor may be particularly associated with and structurally integrated into an operational element of the device, such as a printhead, a transceiver, or a memory management chip. In an embodiment, the second processor is structurally internal to the operational element of the device, effectively obstructing physical/probe access to the second processor.

According to the method, the first or main processor is directed to calculate one or more optimization parameters or optimization control signals for the operational element. The method also directs the first processor to encrypt the optimization parameters/control signals.

The method continues by transmitting the encrypted optimization parameters/control signals to the operational element of the device. At the operational element, the method employs the associated, operational-element-internal secondary processor to decrypt the parameters or control signals. The method then entails the operational element (such as a printhead, transceiver, or memory management chip) to performs it function(s) (such as printing, transceiving, or memory management) in accordance with the decrypted optimization parameters/control signals.

The foregoing illustrative summary, as well as other exemplary objectives and/or advantages of the invention, and the manner in which the same are accomplished, are further explained within the following detailed description and its accompanying drawings.

BRIEF DESCRIPTION OF THE DRAWINGS

FIG. 5 presents a flowchart for an exemplary algorithm to encrypt optimization data in an electronic device such as an exemplary printer.

DETAILED DESCRIPTION

Figure 1:
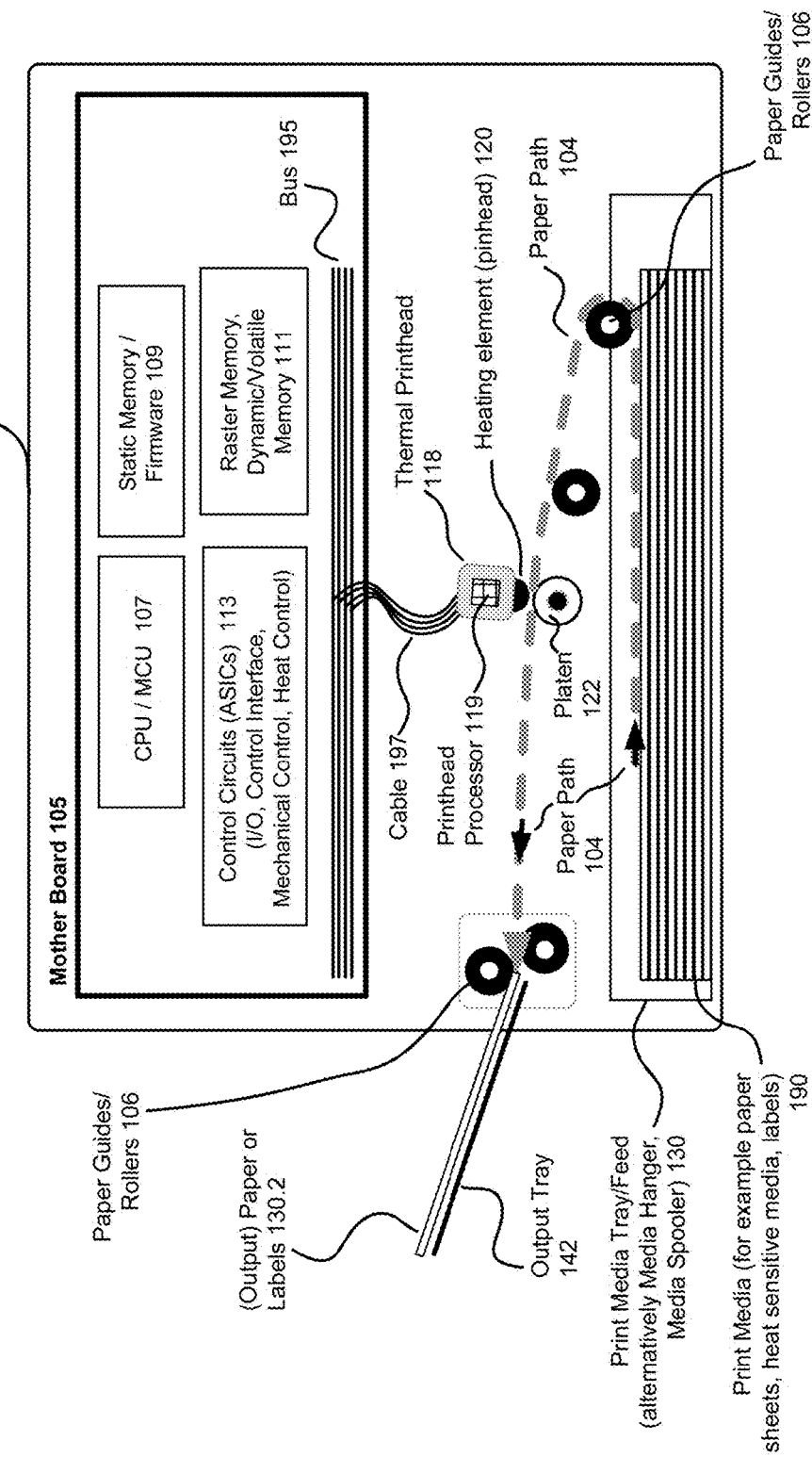
FIG. 1 schematically depicts some elements of an exemplary printer.

In the following description, certain specific details are set forth in order to provide a thorough understanding of various embodiments. However, one skilled in the art will understand that the invention may be practiced without these details. In other instances, well-known structures associated with computers, with printers, with electromechanical digital devices, with other digital devices, with data display, and/or with data storage or data transmission, have not been shown or described in detail to avoid unnecessarily obscuring descriptions of the embodiments.

Unless the context requires otherwise, throughout the specification and claims which follow, the word "comprise" and variations thereof, such as, "comprises" and "comprising" are to be construed in an open sense, that is as "including, but not limited to."

Reference throughout this specification to "one embodiment" or "an embodiment" means that a particular feature, structure or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

The headings provided herein are for convenience only and do not interpret or limit the scope or meaning of the claimed invention.

Reference Numbers: Reference numbers are used throughout the figures, and the first digit of a reference number generally indicates the first drawing where the associated element appears. For example, an element 207 first appears in FIG. 2.

In some instances, an element may be shown in both a generic form and a more specific form or species; in these cases, the specific form or species may be indicated by an appended period ("•") followed by a digit or digits to distinguish a species of the general form. For example, a general print media may have a reference number 190; while a sheet of paper may have a reference number 190.1, a mailing label may have a reference number 190.2, and a sheet of acetate may have a reference number 190.3.

Terminology

Print Media, Physical Print Media, Paper, Labels: The terms print media, physical print media, paper, and labels 190 (see FIG. 1) are used in this document to refer to any tangible, substantially durable physical material which is manufactured, and which is typically thin and flat but pliant, onto which text, graphics or images may be imprinted and persistently retained over time. Typical physical print media 190 are often used for product labeling, item labeling, mailing labels, personal communications, business communications, and to convey prose expression, alphanumeric data, graphs, charts, drawings, advertising, fiction, entertainment content, illustrations and pictures.

Typical print media are often derivatives of wood pulp or polymers, and include conventional office paper, clear or tinted acetate media, news print, envelopes, mailing labels, product labels, and other kinds of labels. Thicker materials, such as cardstock or cardboard may be included as well.

Contrast inducing elements: During a print process, print media may receive contrast-inducing elements such as ink, dye, or toner to create a persistent visual contrast (in black and white, shades of gray, and/or colors). Alternatively, for use in some printers, the print media is itself designed so that its surface contrast, color, or shading can be selectively varied (for example, through selective application by the printer of heat, light, or chemicals) to create a persistent visual contrast. The persistent visual contrast on the print media, once induced by the printer, can be perceived by the human eye as text, images, shapes, symbols, or graphics.

In exemplary embodiments discussed throughout this document, reference may be made specifically to "paper" or "labels" 190; but it will be understood by persons skilled in the relevant arts that the operations, system elements, and methods of such exemplary applications may be applicable to media other than or in addition to the specifically mentioned "paper" or "labels."

Printer: A printer 100 (see FIG. 1) is a device which imprints text, images, shapes, symbols, or graphics onto print media to create a persistent, human-readable representation of text, images, shapes, symbols, or graphics. Common types of contemporary printers include laser printers, light-emitting diode (LED) printers, inkjet printers, and thermal printers, as well as older technologies such as dot matrix printers, impact printers, and line printers.

Typically, printers 100 are designed so that one or more sheets of paper, or one or more labels, or other print media, can be inserted or "fed" into the printer. In typical operation, multiple sheets, print media, or other media are inserted into a holding tray or other media hanger element of the printer for temporary storage. In embodiments, the holding tray or media hanger is internal to shell/casing 102 of printer 100. In an alternative embodiment, the holding tray or media hanger may be external to shell/casing 102, in which case media 190 may be fed into printer 100 via a suitably placed slit in shell/casing 102. In alternative embodiments, individual sheets of print media, or individual labels or tickets, may be hand-fed into a printer one at a time.

In some embodiments of the present system and method, such as those implemented on many thermal printers, the print media may be a roll of labels or tickets which are fed through the printer, and which may be held and fed off of, or spooled off, a spooler/media hanger which internal to the printer. (A spooling media feed is not illustrated in the attached figures.)

(Persons skilled in the relevant arts will appreciate that a roll or labels or tickets may be sometimes referred to as a "ribbon" or "label ribbon". Such a ribbon of labels should be distinguished from a "ribbon cable," which is a flexible cable employed to electronically connect elements within a printer or other devices. See for example cable 197 illustrated in FIG. 1 and other figures of this document, which may also be referred to a "ribbon". It is noted that in thermal printers, the term "ribbon" may also refer to a roll of ink-only (or ink on a suitable substrate ribbon), which is melted under the printhead to transfer the ink from the ink roll onto the print media. Such a ribbon is not illustrated in the figures.)

Command and content instructions are then sent to the printer electronically, for example from an external computer which is communicatively linked to the printer; the printer feeds a sheet of paper, or a label, or other print media into itself, towards a printhead within the printer; and the printhead of the printer then induces contrast (black and white, shades of gray, and/or color) on the print media to imprint the appropriate contents onto the print media.

Exemplary Printer

The present system and method may be applicable to multiple different kinds of printers, including but not limited to thermal printers, LED printers, inkjet printers, laser printers, and other kinds of printers as well.

In an embodiment, the present system and method embraces a printer which provides consistent print quality on a print media by employing multiple activations of a print-head to print a single raster line on the print media. In alternative embodiments, the present invention embraces printers which provide consistent print quality on a print media by employing other kinds of printheads, such as laser printheads or inkjet printheads.

The exemplary embodiment described below pertains to an exemplary thermal printer 100. However, persons skilled in the art will appreciate that the system and method may be applied in other kinds of printers as well, including inkjet printers, LED printers, and laser printers.

FIG. 1 illustrates some exemplary elements of an exemplary thermal printer 100, also referred to herein simply as printer 100. In thermal printer 100, the printer feeds a print media 190 (continuous media, or a media holding label, or ticket) and then print onto the media 190 by either (i) applying heat directly to a heat sensitive media 190 (which is a thermal media), or by (ii) melting a ribbon ink onto conventional (non-thermal) print media 190 (a process known as "thermal transfer printing)". Many elements which may be employed in thermal printers are omitted from the figure, which features mainly elements that contribute to an understanding of the present system and method. In the figure, a print media tray 100 is used to feed sheets of print media 190; but as noted above, thermal printers and other printers may also employ rolls of labels or rolls of tickets (not illustrated in the figure) which are fed off a media spooler (also not illustrated in the figure).

Print process: Presented here are some selected, details of an exemplary print process which may be employed in exemplary thermal printer 100:

Print Step (1), Raster image processing: The document to be printed is encoded in a page description language such as PostScript, Printer Command Language (PCL), Open XML Paper Specification (OpenXPS), or other printer proprietary language. This is typically performed by an external computer (not illustrated) which is connected to printer 100. In some embodiments, however, the source document is encoded on printer 100 itself, for example if printer 100 functions in a dual role as a document scanner. (Scanning elements are not illustrated in FIG. 1.) In alternative embodiments, printer 100 receives the page in the form of an image (such as a graphics file, for example JPG or PNG) from an external device (for example, a computer or an external scanner).

Raster Lines (Scan Lines): A raster image processor converts the page description into a bitmap which is stored in the printer's raster memory 111. Each horizontal strip of dots (also referred to as "pixels" 215) across the raster page is known as a raster line 210, equivalently as a scan line 210 (see FIG. 2, discussed further below). In an embodiment, raster image processing may be performed by the hardware microprocessor of an external computer (for example, the same computer which generates the page description language). In an alternative embodiment, the conversion from a page description language to a raster image is performed on printer 100 itself, for example by central processing unit (CPU/MCU) 107 employing instructions stored in the printer's static memory 109.

Persons skilled in the relevant arts will appreciate that a "raster line" 210 is generally not the same as a "line" of text in a document. Depending on the dot-per-inch resolution of the print process and the point size of a printed line of text, a single line of text may typically be composed of anywhere from a few dozen raster lines to well over one hundred raster lines.

Print Step (2), Paper Feed: Print media 190, such as a media roll or individual sheets of paper, is fed into the printer via a media feed or tray 130. The print media 190 is routed through the printer along a paper path 104 to a printhead via guides 106, rollers 106, and/or other suitable media routing mechanics.

Print Step (3), Printing Raster Lines: Printers 100 use a variety of printheads and printing mechanisms to create contrast (typically black/white, grayscale contrast, and/or colors) to print media 190. Inkjet printers directly print ink onto the print media 190, while laser printers employ a complex combination of light, electrostatic charge, and toner to create contrast on the print media 190.

Exemplary thermal printer 100 employs a thermal printhead 118 with a series of heating elements 120, also referred to as "pinheads", "pin dots", or simply "dots" 120, which are closely spaced along the length of the thermal printhead 118. In an embodiment of the present system and method, a thermal print media 190, which may include for example thermal paper and thermal labels, is heat sensitive. Under the control of CPU 107, and possibly control circuits 113, heating elements 120 of thermal printhead 118 are heated to varying temperatures during the print process. The heat induces contrast on the thermal print media 190. In an alternative embodiment (not illustrated in the figures) printer 100 employs an ink ribbon, which is a ribbon substrate with ink on it. The heat from heating elements 120 melts the ink from the ribbon onto print media 190, and the transferred ink is the source of the contrast on the print media 190.

Generation of Raster Lines: The final output is typically composed of numerous raster lines 210 (see again FIG. 2, below), all parallel to each other and closely spaced or touching each other. In turn, in an embodiment of the present system and method, each individual raster line 210 of the final output may itself be generated as a series of overlapping sequential lines, referred to herein as "line segments" 310 or simply "segments" 310 (see FIG. 3 below), each segment consisting of multiple pixels 215 or dots 215 of varying intensity. The intensity/darkness of each pixel 215 in a raster line is correlated with the heat applied by a corresponding heating element 120 as the print media 190 passes underneath the thermal printhead 118.

In an alternative embodiment (not illustrated in the figures) printer 100 may employ a black print media 190 or other dark colored printer media 190. An ink ribbon with white ink or other light colored ink is then used. Heating elements 120 then melt the white/light-colored ink onto the dark print media 190. The degree of whiteness, that is, the intensity, of the resulting print or image (on the dark background) is proportional to the amount of heat employed. In this document, and for convenience of exposition only, it is generally assumed that print media 190 is white or light-colored, and any print or image which is then imprinted on the media is black, a shade of gray, or some color which presents contrast from the white print media.

It will be noted from FIG. 1 that as print media 190 passes under thermal printhead 118, print media 190 is sandwiched or trapped between thermal printhead 118 and platen 122. Platen 122 may be a roller, which in an embodiment may have a rubber surface or other flexible surface. As print media 190 passes between thermal printhead 118 and platen 122, thermal printhead 118 may impress itself directly upon print media 190, causing contact on print media 190 by heating elements 120 of printhead 118. In an embodiment of the present system and method, the induced contrast at a pixel point on print media 190 is proportionate to both the heat applied by a heating element 120 and the pressure applied by the same heating element 120. In an embodiment, print media 190 may be white or some other non-black color. Heat from a heating element 120 may induce a black or gray pixel 215 on print media 190. The darkness of a pixel 215 on a raster line 210 may increase with both increased heat and with increased pressure. If a consistent pressure is maintained during the print process, then the darkness of a pixel 215 on a raster line 210 increases in proportion with increased heat from a heating element 120.

Print Step (4), Printing Multiple Raster Lines and Paper Release: Printing the full print media is accomplished by continuing to feed print media 190 through printer 100, and repeating step (3) above multiple times, to print multiple successive raster lines 210. The multiple raster lines 210 will create a completed image (text, graphics, or similar) on print media 190. The print media is then released from printer 100 via output tray 142.

Other Exemplary Printer Elements: Exemplary thermal printer 100 may employ other elements as well. Printer 100 may have an external shell or casing 102 which houses most or all of the printer elements. User control elements, paper feed elements, and user information/display elements (not shown in the figure) may be partly or wholly on the exterior of external casing 102.

One or more motors and other electromechanical mechanisms, not illustrated in the figure, are typically employed for effectuating transfer of paper 100 and other materials within printer 100.

A motherboard 105 typically holds and interconnects various microchips used to control and monitor printer 100. Motherboard 105 may include, for example and without limitation:

A central processing unit (CPU) 207 or microcontroller unit (MCU) 207 which provides for overall operational control of printer 100. This includes monitoring printer operations via sensors (not illustrated), and directing printer operations via various application specific integrated circuits (ASICs) 113.

Static memory 109 may store non-volatile operational code (such as internal device drivers) for printer 100. CPU 107 may employ the code stored in static memory 109 in order to maintain the operational control of printer 100.

Volatile memory 111, such as dynamic RAM (DRAM), may be used to store data received from external computers, such as page descriptions, raster images, and other data pertinent to the printing of particular documents.

Control of printer 100 may be maintained in various ways. In some embodiments, CPU 107 of printer 100 may directly control various elements of the printer (such as thermal printhead 118, motors and other mechanical servers, etc.). In other instances, control may be effectuated by CPU 107 via various application specific integrated circuits (ASICs) 113 which act as intermediary control circuits.

Control circuits 113 may support such functions as external input/output (for example, via USB ports, an Ethernet port, or wireless communications, not illustrated in the figure); a control interface for a user control panel or wireless remote on the outside of the printer (not illustrated in the figure); mechanical control of motors and other electromechanical elements; and control of thermal printhead 118.

A system bus 195 may serve to transfer data and messages between elements of motherboard 105, and between motherboard 105 and various other microchips, controllers, and sensors of printer 100. A cable 197, such as a ribbon cable 197, may be used to transfer control and printing data from bus 195 to thermal printhead 118.

Printhead Processor: In an embodiment of the present system and method, printhead 118 may have its own, structurally integrated processor 119. In an embodiment, integrated processor 119 is structurally internal to printhead 118, where integrated processor 119 is structurally shielded from probes to help ensure data security. In an alternative embodiment, integrated processor 119 may be situated on a surface of printhead 118 or be otherwise accessible to electronic probing, in which case alternative means may be employed to prevent, inhibit, or otherwise render ineffective any data probing of integrated processor 119.

Printhead processor 119 may be a general purpose microprocessor with associated firmware, or processor 119 may be a specialized ASIC such as a digital signal processing (DSP) chip. Exemplary applications of printhead processor 119 are discussed further below in this document.

In addition to printhead processor 119, printhead 118 may have its own printhead firmware (not illustrated) providing local code/driver support for printhead processor 119 and its operation(s), such as decryption. In an alternative embodiment, printhead processor 119 may receive code/firmware support from motherboard firmware 109. In an alternative embodiment, printhead processor 119 may have onboard dedicated instructions (dedicated internal firmware) supporting its operations and applications, such as decryption.

Figure 3:
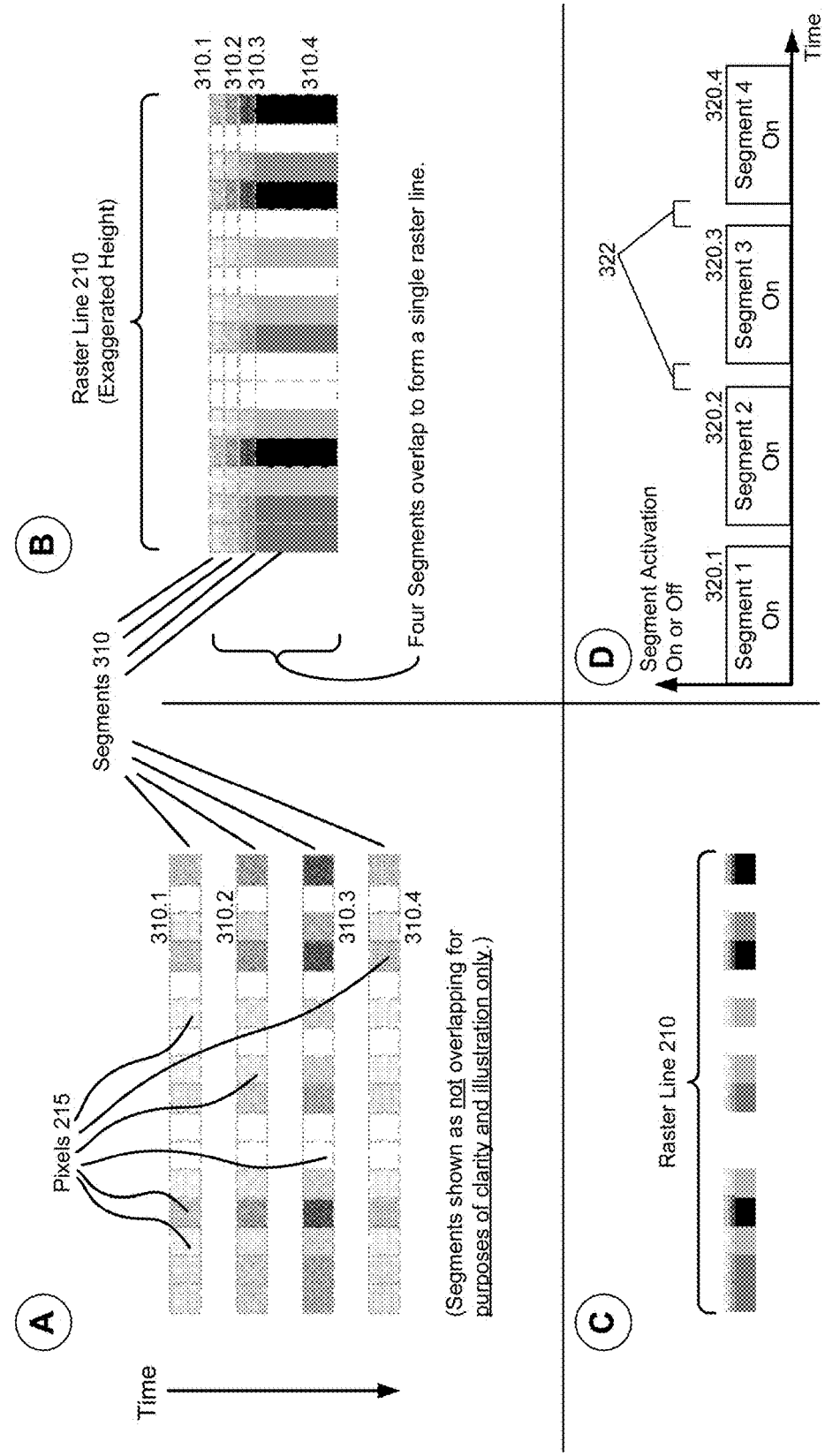
FIG. 3 illustrates exemplary elements of an exemplary print process in a printer which generates a raster line via multiple applications of heat by a thermal printhead.
Figure 4:
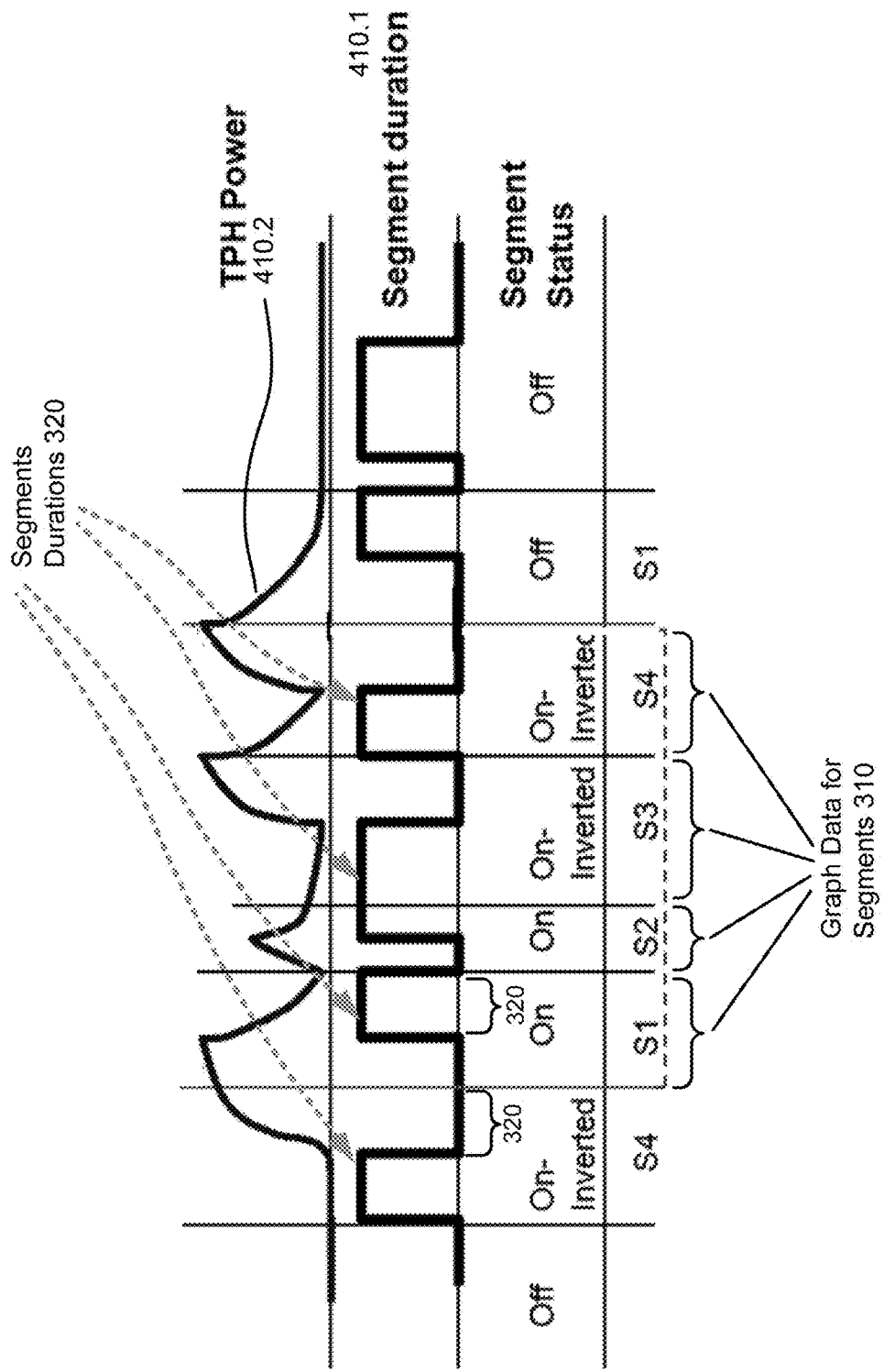
FIG. 4 shows exemplary timing and power plots for an exemplary optimization algorithm for an exemplary thermal printer.

In addition to printhead processor 119, printhead 118 may have its own dynamic/volatile memory (not illustrated) for data storage, to store for example and without limitation encrypted segment information 570 and/or plaintext segment information and/or segment timing 320, 410.1 (see FIGS. 3, 4 and 5). In an alternative embodiment, printhead processor 119 may rely upon internal registers or internal cache memory for short-term data storage.

Data Exposure and Tapping: It will be noted that if shell/casing 102 is opened, various physical elements of printer 100 may be exposed for direct physical contact. For example, pins on any of microchips 107, 109, 111, 113 may be physically connected to via external probing devices. Similarly, the copper (or "PCB lines") of printed circuit board 105, including bus lines 195, may be exposed for tapping by external probes. Cable 197 may also by physically tapped (if necessary, a third party tapping into cable 197 may first remove any outside insulating material on cable 197).

As a result of the potential for physical tapping, the security of internal data communications within printer 100 may be compromised by a party determined to "hack" or reverse engineer elements of the printer design.

Other printer embodiments: Different printers 100 implement these steps described above in distinct ways, and some elements may be referred to by other terms or generic terms. For example, the elements directly responsible for printing onto the print media 100 may be referred to generically as the printhead 118.

Separate Data/Control Paths: In an embodiment of the present system and method, print data such as on/off data for individual pinheads 120, may be transferred to thermal printhead 118 via a first hardware data path, while print quality control parameters may be passed to printhead 118 via a second hardware data path. For example, cable 197 may actually have multiple sub-cables within (not illustrated in FIG. 1), one to carry the print data and a second to carry the printhead quality control data. The use of separate hardware data paths may help support internal data security, and may ensure that even if the print data is not encrypted, the printhead quality control data may be encrypted.

In an alternative embodiment, both print data (such as pixel intensities for a raster line) and printhead quality control data may be carried along a common hardware data path, such as a "single path" ribbon cable 197. In a single cable embodiment, separate lines within cable 197 may be used for different classes of data (unencrypted and encrypted). For example, individual data lines one through six of a cable 196 may transmit plaintext print data, while lines seven through ten may transmit encrypted control data.

In an alternative single-cable embodiment, separate virtual data paths may be employed, for example by using packet-oriented data communications between CPU 107 and printhead 118/printhead processor 119. In an embodiment, data packets carrying print data may be unencrypted, while data packets carrying print quality control data may be encrypted, thereby establishing essentially two different virtual data paths.

Exemplary Printhead

Figure 2:
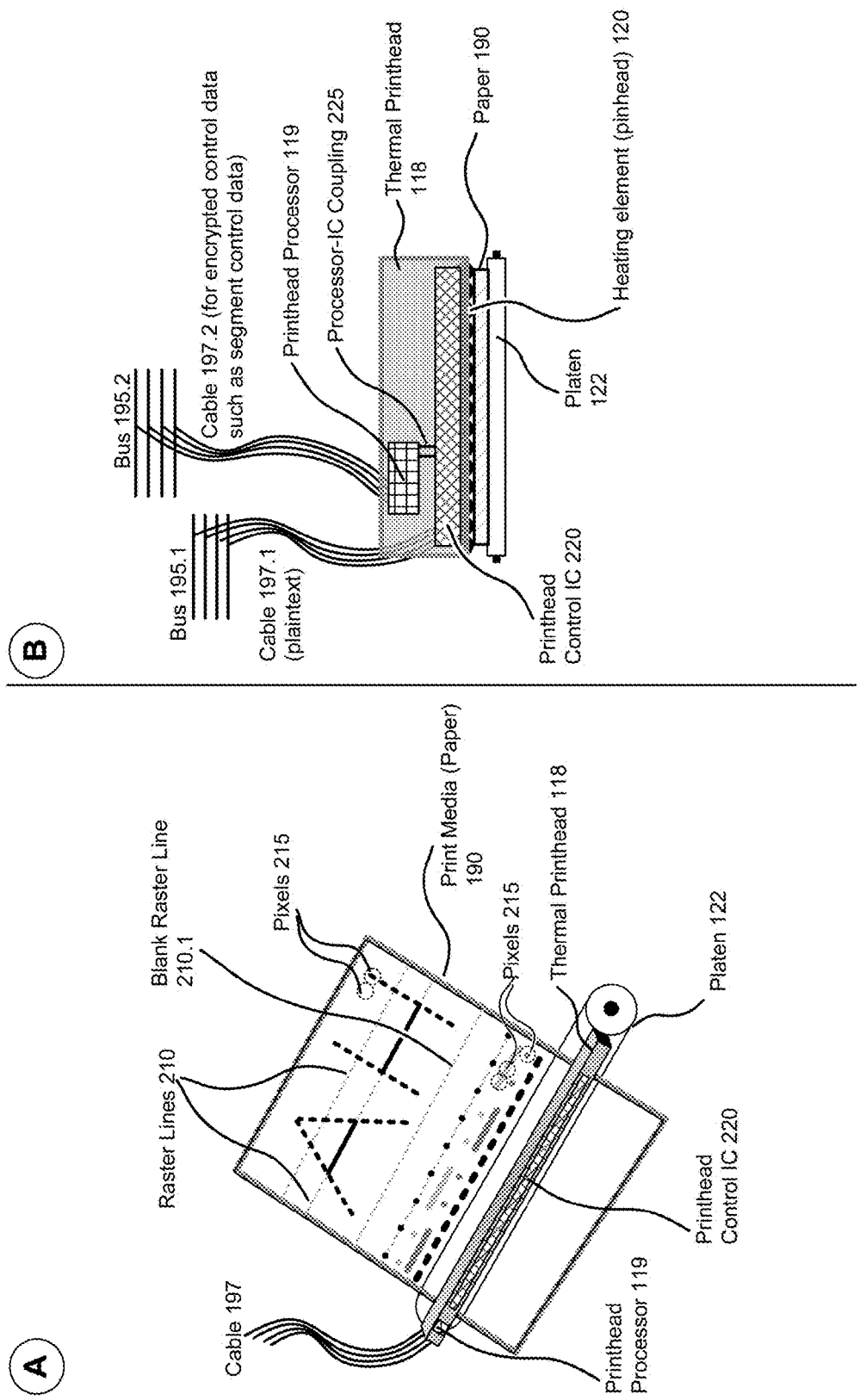
FIG. 2 provides two views of some exemplary elements of an exemplary thermal printer.

FIG. 2 provides two views (in panels (A) and (B)) of some exemplary elements of exemplary thermal printer 100.

Panel (A): Panel (A) of FIG. 2 illustrates a sheet of paper 190 being fed between thermal printhead 118 and platen 122. Thermal printhead 118 and platen 122 are parallel to each other along their length or central axis, and configured to be in contact with each other (or in very close proximity, generally a distance less than that thickness of a sheet of print media 190 and verging on contact) if no print media 190 is present between them.

In an embodiment of the present system and method, a contact pressure is applied to both thermal printhead 118 and platen 122 at suitable support points (typically at or near the ends of each element), with the contact pressure on each element opposing the contact pressure on the other. When no paper 190 is present between thermal printhead 118 and platen 122, then thermal printhead 118 and platen 122 may be directly in contact and pressing against each other. Persons skilled in the art will recognize that such contact pressure may be provided by a variety of structural elements of printer 100, including interior support elements which may be flexible and provide tension or pressure, such as springs, which are not illustrated in the figures.

In an embodiment of the present system and method, platen 122 may have a compressible coating, such as rubber, which can compress to permit print media 190 to be interposed between platen 122 and thermal printhead 118 even if the latter two elements are configured for direct physical contact.

Raster Lines: Also illustrated in Panel (A) are some exemplary raster lines 210, showing the results of printing the letters "AH" as well as some pattern of raster lines 210 which may for example be part of a drawing, photograph, or graph. Persons skilled in the art will appreciate that only a few exemplary raster lines 210 are illustrated, and that the entire image is composed of successive raster lines 210 (which includes entirely blank lines) 210.1.

For purposes of illustration only of some exemplary raster lines and their orientation on print media 190, blank or empty portions of raster lines 210 are shown in FIG. 2 as dotted and shaded light gray. Raster lines 210 are oriented parallel to the length of thermal printhead 118 and platen 122.

Persons skilled in the relevant will appreciate that essentially the entire image imprinted on print media 190 is composed of successive, immediately adjacent raster lines 210, which may include entirely blank raster lines 210.1 (that is raster lines 210.1 which are white across the entire width of the page), but that only a handful of raster lines 210 are included in FIG. 2.

For purposes of illustration and clarity of exposition only, and to clearly distinguish individual exemplary raster lines 210, the handful of exemplary raster lines 210 are shown in Panel (A) as separated by from each other, when in actual printing the full page is composed of many more substantially adjacent raster lines 210. For example, a 300 dot-per-inch (dpi) printing process which runs ten inches from top to bottom of the page may be composed of 10*300=3000 raster lines (some of which may, however, be blank or white raster lines).

Typically, except where white space is actually required in the shaping of alphanumeric text or in figures, raster lines 210 which employ contrast (that is, are not white across their entire length) are printed sufficiently close together, or even slightly overlapping, so as to create smooth, continuous image elements. In the figure, adjacent pixels 215 on a common, same raster line 210 are shown as adjacent and continuous, where applicable (such as the horizontal "bar" elements of the letters "A" and "H".

Pixels: A raster line may include any of black pixels 215, white pixels 215 (or more generally clear pixels 215, which simply reveal the underlying color of print media 190), colored pixels 215, and various intensities of pixels 215 (such as grayscale pixels or intensities of color pixels).

Panel (B): Panel (B) presents another view of the printer elements shown in panel (A).

In embodiments of the present system and method, thermal printheads 118 typically include a printhead control integrated circuit (IC) 220 (or in some cases, multiple such circuits). The printhead control IC 220 is typically driven directly by CPU/MCU 107 of printer 100, though it may be driven or controlled by other control circuits 113. The printer control IC 220 typically contains a multitude of respective registers, gates, and latches (not shown in the figure) which correspond to the pins 120 of the printhead 118. The registers, gates, and latches working together can accept can accept binary data from CPU 107 indicating which pins are to be heated or not heated for printing a given raster line. In embodiments, a data line, strobe line, latch line, and clock line (not shown in the figure) feed signals from CPU 107 to printhead control IC 220, thereby controlling the print process. The data may be carried via cable 197, 197.1.

Persons skilled in the relevant arts will understand that, in embodiments of the present system and method, while printhead control IC contains logic gates, switches, and other control elements, it typically does not contain the elements associated with a general purpose hardware microprocessor, nor does it typically contain the processing elements typically associated with encryption/decryption tasks.

As already discussed above, in an embodiment of the present system and method, printhead 118 has embedded within (or possibly has attached on an external surface) a hardware printhead processor 119. In an embodiment of the present system and method, printhead processor 119 may include elements typically associated with general purpose microprocessors such as, for example and without limitation: combinational logic, sequential digital logic, arithmetic logic, general purpose logic, instruction control logic, multiple general purpose and/or specialized data registers, data buffers, and data addressing/memory access elements (not illustrated in the figure). In an alternative embodiment, printhead processor 118 may be a dedicated encryption/decryption processor (that is, a specialized application specific integrated circuit (ASIC)).

In an embodiment, printhead processor 119 is configured to turn power on and turn power off for individual pins 120 by signaling printhead control IC 220. Printhead processor 119 may be communicatively coupled with printhead control IC 220 via a processor-IC coupling 225. (Printhead control data and the encryption of printhead control data are discussed further below in this document.)

In support of printhead processor 119, printhead 118 may also include its own dedicated random access memory (not shown in the figure), and may include a chip with firmware (also not shown in the figure).

In an alternative embodiment of the present system and method, printhead processor 119 and printhead control ICs (220) may be integrated onto a single microchip which serves the functions of both.

In an embodiment, printhead processor 119 typically receives encrypted segment data 570 (see FIGS. 3, 4, and 5 below) from CPU 107, though printhead processor 119 may be driven or controlled by other control circuits 113. The data may be carried via cable 197, 197.2.

In an embodiment of the present system and method, when paper 190 is fed between thermal printhead 118 and platen 122, paper 190 is subject to compression pressure along its width from the elements of thermal printhead 118 and platen 122. The pressure causes print media 190 to receive heat from heating elements 120, in proportion as such elements are individually heated in a raster line. This in turn induces contrast on print media 190.

In an embodiment of the present system and method, printer 100 may have two separate data paths which are substantially electrically isolated from each other. For example, a first data bus 195.1 and/or a first ribbon cable 197.1 may carry plaintext data raster line data or plaintext pixel data from CPU 107 to thermal printhead 118, and in particular to printhead control IC 220. A second data bus 195.1 and/or a second ribbon cable 197.2 may carry encrypted control data 570 (see FIG. 5 below) from CPU 107 to thermal printhead 118, and in particular to printhead processor 119.

First data path 195.1, 197.1 and second data path 195.2, 197.2 may be data-isolated from each other so that tapping into one path does not enable acquiring data which is carried by the other path. (Printhead control data and the encryption of printhead control data are again discussed further below in this document.)

Exemplary Print Optimization Algorithm for Raster Line Generated as Multiple Overlapping Segments FIG. 3 illustrates elements of an exemplary print process 300 (also called a "burn" process 300) where printer 100 generates a single raster line 210 on print media 190 via multiple overlapping, time-sequential applications of heat by thermal printhead 118. Each single overlapping heat-application application, also referred to as "marking" or "burning" the print media 190, induces on print 100 a segment 310. As discussed further below, multiple overlapping segments form a single raster line 210.

In an embodiment of the present system and method, print process 300 is an optimized print process. In an embodiment of the present system and method where printer 100 employs a thermal printhead 118 for thermal printing, print process 300 may employ a thermal management algorithm 400 (see FIG. 4 below) to optimize the heating of thermal printhead 118.

Segmenting the burn process 300, that is, generating a raster line 210 by printing multiple segments 310, is used to reduce the amount of energy required to mark the media 190 and also to prevent damage to thermal printhead 118.

Segments 310 may also be referred to as thermal printhead segments, or TPH segments. FIG. 3 illustrates exemplary four TPH segments 310 of a single raster line 210. In alternative embodiments, more or fewer TPH segments 310 may be used to generate a raster line 210.

In Panel (A), and for purposes of exposition and explanation only, the four segments 310 are illustrated with large gaps between them, that is, as not overlapping. It will be seen that the segments 310.1, 310.2, 310.3, and 310.4 are generated sequentially in time, one after another. As may also be seen from the figure, the segments may vary in darkness. In an embodiment, the variation in darkness may result from a variation over time in the temperature set for a given pinhead 120 when generating a given pixel 215 of a segment 310. In an alternative embodiment, the variation in darkness may result from a variation over time in the duration of time for which a pinhead 120 is heated.

In an embodiment, and to avoid thermal damage to printhead 118, each separate burn or heating time, which generates each segment 310.1, 310.2, 310.3, and 310.4, is separated by a short time interval 322 when the heat in the pins 120 is reduced or turned off. Typically, pinheads 120 print on print media 190 by generating heat up to a few hundred degrees centigrade. A thermal management algorithm 400 optimizes the energy sent to the pinheads 120 of printhead 118. The thermal management algorithm 400 heat in the pinheads 120 on and off, which helps deal with (that is, dissipate) residual heat inside the pinheads 120. This helps maintain sharp edges on the resulting raster lines 120 and the resulting overall print output.

Panel (B) of FIG. 3 illustrates the four segments 310 as overlapping, to generate a single raster line 210. In Panel B, the height of raster line 210 has been deliberately exaggerated to illustrate the overlap of the segments 310, and also to illustrate how the segments 310 may not perfectly overlap; as a result, a leading edge of raster line 210 may not print as darkly as the main portion of raster line 210. In practice, the reduced or lighter contrast area is so thin as to have no practical effect on print quality.

Panel (C) of FIG. 3 again illustrates exemplary four segments 310, and resulting exemplary raster line, with a somewhat more realistic height-to-width ratio. It may be seen that the overprinting of multiple segments 310 may result in a raster line 210 which, for most of its height, has a darkness or contrast suitable for the desired output image.

It will be noted that in FIG. 3, raster line 210 is illustrated as being only sixteen pixels wide. This is for purposes and convenience of illustration only. In typical application, a raster line 210 may have hundreds or thousands of pixels 215 to print its full width across print media 190.

Panel (D) of FIG. 3 shows an exemplary timing information for segment activation. The timing information indicates time intervals 320 when printing is activated and a segment 310 is printed via heating of pins 120 of thermal printhead 118, and also in-between times 322 (shown as white spaces between segments 320) when printhead 118 is not being powered for printing. The timing information plot may also be referred to as a "thermal activation timing signal" ("TATS") 320. Note however that during off-segments 322, printhead 118 may be briefly emitting heat as it cools down, and the heat may still be sufficient to induce some degree of contrast on print media 190.

As noted above, and in an embodiment of the present system and method, two separate, internal hardware data paths may be employed. A first hardware data path 195.1, 197.1 between CPU 107 and printhead 118 may convey pixel intensities for a raster line 210 or convey other whole-raster-line information. A second hardware data path 195.2, 197.2 between CPU 107 and printhead 118 may convey print quality control information, such as timing information for segments 310 of the raster line 210.

For example, cable 197 (FIG. 1 above) may have two separate hardware data paths, or two separate cables 197.1, 197.2 may be employed. Similarly, system bus 195 (FIG. 1 above) may employ separate data paths, for example separate copper pathways (that is, separate PCB lines) 195.1, 195.2, one to convey print data such as pixel intensities, and another to convey timing information or other print quality-related information for segments 310.

Exemplary Thermal Management Algorithm: The timing shown in Panel D of FIG. 3, which indicates four segment activations 320 of substantially equal duration, separated by three off-intervals 322 of printhead-heating/segment-printing being inactive, is exemplary only. An optimized segment heating process 300 may employ a thermal management algorithm 400, which may employ other activation intervals 320 of varying durations. Further, the exemplary segment activations 320 illustrated in panel D of FIG. 3 are on/off only; they do not indicate that heat or power (which may be average heat or power, or total heat or power to printhead 118) may vary from one segment 320 to another. An optimized segment printing process 300 using a thermal management algorithm 400 may employ different amounts of heat or power (average or total) for different segment activations 320. Further, more or fewer than four segment activations may be employed.

In an embodiment, optimized segment durations 320 and segment power levels for optimized printing and for optimized durability of printhead 118 may be determined based on various engineering and materials considerations. In an alternative embodiment, optimized durations and power levels may be determined via research, development, and testing of printer 100. Optimized segment durations 320 and segment power levels for optimized printing and for optimized durability of printhead 118 may be stored in printer 100, for example in static memory 109, ASICs 113, or even in dynamic memory 111 (for example, as part of printer driver software). In an embodiment, optimized segment durations 320 and segment power levels for optimized printing and for optimized durability of printhead 118 may be varied depending on such factors as page size for print media 190, or the material of print media 190, or image size, or even based on a recent total duration of use of thermal printhead 118. Other factors may be taken into account as well.

In an embodiment of the present system and method, the thermal management (TM) algorithm controls two main aspect on the TPH segments 310 and their timing intervals 320:

(1) Selecting which TPH dots 120 to activate depending on the data to currently print, the data that has been previously printed, and the next few raster lines 210 to be printed.

(2) Determining a segment duration 320, that is, how long (for what time duration) to activate and deactivate each TPH segment 310 for each printed line. In an embodiment of the present system and method, different segments 310 of a raster line 210 may be activated for unequal segment durations 320. Similarly, segment off-intervals 322 may be of the same duration or different durations.

FIG. 4 shows exemplary plots 410 of an exemplary thermal management (TM) algorithm 400 for an exemplary thermal printer 100. The four different segments 310 are activated to print one raster line 210, with indicated durations. A first plot 410.1 shows exemplary durations 320 of time for the power to thermal printhead 118 (and its pinheads 120) to be powered on for each segment 310. Persons skilled in the relevant arts will recognize that the plot 410 is therefore an exemplary thermal activation timing signal (TATS) 320, reflecting some particular exemplary thermal management algorithm. In an embodiment, the present system and method may flag some segments 310 as being "inverted", meaning power is off when otherwise on for a non-inverted segment, and power is on when otherwise off for a non-inverted segment.

In an embodiment of the present system and method, the TATS 320 is provided to the printhead control integrated circuit (IC) 220 from the printhead processor 119. The TATS signal 320 generates segments 310 by activating or de-activating the strobe line (one of the internal chip control lines) of printhead control IC 220.

A second plot 410.2 shows an exemplary power level for the printhead 118 during the same periods of time. The power may be for example an average power or a maximum supplied power to a pinhead 120 (with some pinheads 120 heated more or less than others depending on the associated, intended pixel darkness); alternatively, plot 410.2 may represent heat levels (for example, average or maximum); alternatively, plot 410.2 may represent applied voltage levels or currents at printhead 118.

Persons skilled in the relevant arts will appreciate that the plot shown is exemplary only, and may vary according to TM algorithms 400 employed, and may further vary for a given TM algorithm depending on the particular print requirements of a given document or raster line 210. For example, not all segments 310 may be necessary, or more may be used.

Proprietary Optimization Algorithms and Exemplary Printer-Internal Data Security The following will be noted:

The quality of the printout is dependent on the segment 310 activation and the duration 320 of the segment.

These quality settings are intended to optimize printer performance, and may vary according to many other elements of printer design, including for example and without limitation materials used for pinheads 120, size and shape of pinheads 120, spacing of pinheads 120, speed of transport of print media 190 through the printer, and other factors as well. These quality settings may be among the most difficult to define and "tweak" during printer development, and so may be considered an important and expensive elements of product development.

The TM algorithm 400 for a printer may therefore be considered as a trade secret, but can still be reversed engineered due to a lack of internal printer data security. For example, with suitable electronic probes, an oscilloscope may be used to identify the timing for turning on and off each of the pinheads 120.

Due to the desire to maintain the thermal management algorithm 400 as a trade secret, it may be desirable to implement internal data security for control data within printer 100.

Device-Internal Data Encryption

As discussed above, it may sometimes be desirable to maintain data security for data transmitted internally within an electronic device, such as printer 100. Internal data may reflect or indicate proprietary methods used internally, such as various optimization algorithms, which should be maintained as confidential.

In an embodiment, the present system and method may employ device-internal data encryption to protect proprietary internal optimization algorithms for a printer 100. However, the general method disclosed herein may be applied to any electronic device where sensitive or proprietary control or proprietary system/operations optimization data is transmitted internally from a first device-internal component (such as for example and without limitation a CPU 107) to a second device-internal component (such as for example and without limitation a printhead 118).

FIG. 5 presents a flowchart for an exemplary algorithm to encrypt optimization data in an electronic device. In an embodiment, the flowchart may be implemented as processor code for encrypting timing data 320, 410.1 and/or power data for a printhead 118 which optimizes printing within a thermal printer 100.

If printer 100 does not employ encryption for its internal optimization data and other control data, the timing data 320, 410.1 are publicly exposed as they are carried along bus 195, cable 197, or other lines that connect printhead 118 to CPU 107. The present system and method may employ symmetric or asymmetric encryption to encrypt the data 320, 410.1 for segment timing and segment activation, as the data is carried between CPU 107 and printhead 118.

In an exemplary embodiment, CPU 107 first encrypts the segment information 320, 410.1, and sends the encrypted data to a printhead processor 119 of printhead 118. Printhead processor 118, or firmware or other storage within printhead 118, contains the necessary logic to decrypt the segment information 320, 410.1. Printhead 118, controlled in whole or in part by printhead processor 119, then activates the burning time of pins 120 according to the received and decrypted segment information.

In an embodiment of the present system and method, otherwise-exposed system lines (part or all of bus 195, part or all of ribbon 197, and/or other dedicated internal hardware data lines between CPU 107 and printhead 118) that were susceptible to being probed for reverse engineering purposes may now only host timing data that is encrypted. Hence, data probing becomes ineffective and unusable for parties who do not have the necessary decryption key. The encryption and decryption are done internally, inside CPU 107 and inside the printhead 118, and so are not accessible by any user or third party.

Exemplary Method: Panel (A) of FIG. 5 presents a flowchart of an exemplary method 500 for internal data encryption and decryption within exemplary printer 100.

Method 500 begins with step 505. In an embodiment, in step 505 raster image data is received by main printer CPU 107. In an alternative embodiment, the raster data is itself generated internally by CPU 107, based for example on data received in various image formats well known in the art (such as JPG, BMP, PNG, TIFF, and other image formats).

In step 510 of method 500, CPU 107 calculates plaintext segment information 320 for a raster line. In an embodiment, the segment information may including segment duration 410.1 and also segment power 410.2. In an alternative embodiment, segment information may include only segment duration 410.1. In an alternative embodiment, other segment information 320 may be included as well. Considerations and algorithms involved in segment calculations are discussed above in this document, and the discussion will not be repeated here. (See FIGS. 3 and 4, and other discussion.)

With reference now also to the elements of Panel (B) of FIG. 5: In step 515 of method 500, CPU 107 encrypts the plaintext segment information 320, generating encrypted segment information 570. The encryption may employ any number of encryption algorithms 560 well know in the art, including for example and without limitation DES, AES, MD5, SHA, RSA, Cramer-Shoup, ElGamal, PGP, and others. Generation of the encrypted segment information 570 may entail input, into the encryption algorithm 560, of an encryption key 565. Encryption key 565 may be stored as firmware directly on CPU 107, or may be stored in firmware 109 or ASICs 113 of printer 100.

In step 520 of method 500, plaintext data for an entire raster line 210 is sent from CPU 107 to printhead 118. The data may be sent via a general bus 195 and ribbon cable 197, or may be sent via a first data path meant for plaintext data, such as a first bus 195.1 or first ribbon 197.1.

In step 525 of method 500, the encrypted segment information 570 for the raster line 210 is transmitted to printhead 118. As discussed above, and in an embodiment of the present system and method, the encrypted segment data 570 may be sent over a dedicated data path, such as a second bus 195.1 and/or a second ribbon cable 197.2, which may not include main bus 195.1 nor ribbon cable 197.2, but which may be structurally similar in other respects (see FIG. 2, Panel (B) above). In an alternative embodiment, the encrypted segment data 570 may be sent over a dedicated data path which is an element or part of bus 195 and/or cable 197; in such an embodiment, system bus 195 and/or cable 197 may also have a second data path for all other data, which may typically be non-encrypted data.

In another alternative embodiment, the encrypted segment data 570 may be sent over bus 195 and/or cable 197, sharing the same hardware data path used for all other data, which may typically be non-encrypted data. In the latter case, encrypted segment data 570 may still be sent over bus 195 and/or cable 197 in different data packets or different time slots/frames from other non-encrypted data, or in other ways distinguished from non-encrypted data, according to methods which may be familiar to persons skilled in the relevant arts.

In step 530 of method 500, the defining data for the raster line 210 (for example, intended intensities of pixels 215) is received by printhead 118. In an embodiment, the raster line data is received by printhead processor 119. In an alternative embodiment, the raster line data may be received by other processing elements or microchips of printhead 118 (not shown in the figures). In an alternative embodiment the raster line data may be received in the form of voltage levels or power levels which are substantially routed directly to pins 120 of printhead 118.

In step 535 of method 500, the encrypted segment data 570 for the raster line 210 is received at printhead processor 119.

In step 540 of method 500, the encrypted segment data 570 for the raster line 210 is decrypted by printhead processor 119, resulting in the recovery within printhead 118 of plaintext segment data 320.

Again with reference now to elements of Panel (B) of FIG. 5: In step 540 of method 500, printhead CPU 119 receives the encrypted segment data 570. Printhead CPU then employs a decryption algorithm 580 which is designed/coded to unencrypt data which has been encrypted by encryption algorithm 560. Printhead CPU 119 decrypts the encrypted segment information 570, thereby recovering plaintext segment information 560. Recovery of the decrypted segment information 320 may entail input, into encryption algorithm 580, of a decryption key 585. Decryption key 585 may be stored as firmware (not illustrated in the figures) directly on printhead 118, or may be stored in firmware 109 or ASICs 113 of printer 100.

Because the decryption step 540 occurs internally to printhead 118 and in particular internally to printhead processor 119, the decrypted data 320 is not accessible to a third party who is using printer 100 or trying to reverse engineer printer 100.

In step 545 of method 500, printhead 118 prints the raster line 210, printing multiple segments (see FIGS. 3 and 4 above), in accordance with segment data 320, 410, now in plaintext form 320.

Method 500 is repeated by printer 100 for each raster line 210 of a printed page, until the entire page is printed.

Additional Embodiments

In an embodiment of the present system and method, typical on-off timings 320 for segments 310 may be on the order of milliseconds, for example: on for 20 msec; off for 40 msec; then on for 10 msec; off for 50 msec.

In an exemplary embodiment, print media 190 moves through printer 100 continuously throughout the print process. However, the timings 320 for the segments 310 are sufficiently brief that the print media 190 may be considered as substantially stationary or semi-stationary while several successive segments 310 are printed. As a result, and as discussed in detail above, several segments 310 printed successively will overlap enough to form one single raster line 210.

While the present system and method has been described above with respect to an exemplary thermal printer 100 and thermal printhead 118, persons skilled in the relevant arts will appreciate that the present system and method may be applied to other types of printers 100 as well. For example, laser printers 100 and inkjet printers 100 may have timing information as well, or may have other quality control information.

For example, for an inkjet printer 100, the timing information may apply to how long a period of time to apply ink for a given raster line, or to a total or maximum amount of ink to spread for a given raster line. This may compensate for build-up of ink in the printers printhead. The data could be applied to RGB or CYMK channels.

For another example, for a laser printer, quality control information could be applied to a maximum or average charge to be applied to a charging wire over a period of time, to a maximum or average intensity of the laser beam over a period of time, or to varying an amount of toner to be transferred from a toner hopper to a photoreceptor drum.

In all such cases, it may be desirable to internally encrypt the quality control data to keep the quality control algorithm proprietary.

To supplement the present disclosure, this application incorporates entirely by reference the following commonly assigned patents, patent application publications, and patent applications:

U.S. Pat. Nos. 6,832,725; 7,128,266; 7,159,783; 7,413,127; 7,726,575; 8,294,969; 8,317,105; 8,322,622; 8,366,005; 8,371,507; 8,376,233; 8,381,979; 8,390,909; 8,408,464; 8,408,468; 8,408,469; 8,424,768; 8,448,863; 8,457,013; 8,459,557; 8,469,272; 8,474,712; 8,479,992; 8,490,877; 8,517,271; 8,523,076; 8,528,818; 8,544,737; 8,548,242; 8,548,420; 8,550,335; 8,550,354; 8,550,357; 8,556,174; 8,556,176; 8,556,177; 8,559,767; 8,599,957; 8,561,895; 8,561,903; 8,561,905; 8,565,107; 8,571,307; 8,579,200; 8,583,924; 8,584,945; 8,587,595; 8,587,697; 8,588,869; 8,590,789; 8,596,539; 8,596,542; 8,596,543; 8,599,271; 8,599,957; 8,600,158; 8,600,167; 8,602,309; 8,608,053; 8,608,071; 8,611,309; 8,615,487; 8,616,454; 8,621,123; 8,622,303; 8,628,013; 8,628,015; 8,628,016; 8,629,926; 8,630,491; 8,635,309; 8,636,200; 8,636,212; 8,636,215; 8,636,224; 8,638,806; 8,640,958; 8,640,960; 8,643,717; 8,646,692; 8,646,694; 8,657,200; 8,659,397; 8,668,149; 8,678,285; 8,678,286; 8,682,077; 8,687,282; 8,692,927; 8,695,880; 8,698,949; 8,717,494; 8,717,494; 8,720,783; 8,723,804; 8,723,904; 8,727,223; 8,740,082; 8,740,085; 8,746,563; 8,750,445; 8,752,766; 8,756,059; 8,757,495; 8,760,563; 8,763,909; 8,777,108; 8,777,109; 8,779,898; 8,781,520; 8,783,573; 8,789,757; 8,789,758; 8,789,759; 8,794,520; 8,794,522; 8,794,525; 8,794,526; 8,798,367; 8,807,431; 8,807,432; 8,820,630; 8,822,848; 8,824,692; 8,824,696; 8,842,849; 8,844,822; 8,844,823; 8,849,019; 8,851,383; 8,854,633; 8,866,963; 8,868,421; 8,868,519; 8,868,802; 8,868,803; 8,870,074; 8,879,639; 8,880,426; 8,881,983; 8,881,987; 8,903,172; 8,908,995; 8,910,870; 8,910,875; 8,914,290; 8,914,788; 8,915,439; 8,915,444; 8,916,789; 8,918,250; 8,918,564; 8,925,818; 8,939,374; 8,942,480; 8,944,313; 8,944,327; 8,944,332; 8,950,678; 8,967,468; 8,971,346; 8,976,030; 8,976,368; 8,978,981; 8,978,983; 8,978,984; 8,985,456; 8,985,457; 8,985,459; 8,985,461; 8,988,578; 8,988,590; 8,991,704; 8,996,194; 8,996,384; 9,002,641; 9,007,368; 9,010,641; 9,015,513; 9,016,576; 9,022,288; 9,030,964; 9,033,240; 9,033,242;

9,036,054; 9,037,344; 9,038,911; 9,038,915; 9,047,098; 9,047,359; 9,047,420; 9,047,525; 9,047,531; 9,053,055; 9,053,378; 9,053,380; 9,058,526; 9,064,165; 9,064,165; 9,064,167; 9,064,168; 9,064,254; 9,066,032; 9,070,032; 9,076,459; 9,079,423; 9,080,856; 9,082,023; 9,082,031; 9,084,032; 9,087,250; 9,092,681; 9,092,682; 9,092,683; 9,093,141; 9,098,763; 9,104,929; 9,104,934; 9,107,484; 9,111,159; 9,111,166; 9,135,483; 9,137,009; 9,141,839; 9,147,096; 9,148,474; 9,158,000; 9,158,340; 9,158,953; 9,159,059; 9,165,174; 9,171,543; 9,183,425; 9,189,669; 9,195,844; 9,202,458; 9,208,366; 9,208,367; 9,219,836; 9,224,024; 9,224,027; 9,230,140; 9,235,553; 9,239,950; 9,245,492; 9,248,640; 9,250,652; 9,250,712; 9,251,411; 9,258,033; 9,262,633; 9,262,660; 9,262,662; 9,269,036; 9,270,782; 9,274,812; 9,275,388; 9,277,668; 9,280,693; 9,286,496; 9,298,964; 9,301,427; 9,313,377; 9,317,037; 9,319,548; 9,342,723; 9,361,882; 9,365,381; 9,373,018; 9,375,945; 9,378,403; 9,383,848; 9,384,374; 9,390,304; 9,390,596; 9,411,386; 9,412,242; 9,418,269; 9,418,270; 9,465,967; 9,423,318; 9,424,454; 9,436,860; 9,443,123; 9,443,222; 9,454,689; 9,464,885; 9,465,967; 9,478,983; 9,481,186; 9,487,113; 9,488,986; 9,489,782; 9,490,540; 9,491,729; 9,497,092; 9,507,974; 9,519,814; 9,521,331; 9,530,038; 9,572,901; 9,558,386; 9,606,581; 9,646,189; 9,646,191; 9,652,648; 9,652,653; 9,656,487; 9,659,198; 9,680,282; 9,697,401; 9,701,140;
U.S. Design Pat. No. D702,237;
U.S. Design Pat. No. D716,285;
U.S. Design Pat. No. D723,560;
U.S. Design Pat. No. D730,357;
U.S. Design Pat. No. D730,901;
U.S. Design Pat. No. D730,902;
U.S. Design Pat. No. D734,339;
U.S. Design Pat. No. D737,321;
U.S. Design Pat. No. D754,205;
U.S. Design Pat. No. D754,206;
U.S. Design Pat. No. D757,009;
U.S. Design Pat. No. D760,719;
U.S. Design Pat. No. D762,604;
U.S. Design Pat. No. D766,244;
U.S. Design Pat. No. D777,166;
U.S. Design Pat. No. D771,631;
U.S. Design Pat. No. D783,601;
U.S. Design Pat. No. D785,617;
U.S. Design Pat. No. D785,636;
U.S. Design Pat. No. D790,505;
U.S. Design Pat. No. D790,546;
International Publication No. 2013/163789;
U.S. Patent Application Publication No. 2008/0185432;
U.S. Patent Application Publication No. 2009/0134221;
U.S. Patent Application Publication No. 2010/0177080;
U.S. Patent Application Publication No. 2010/0177076;
U.S. Patent Application Publication No. 2010/0177707;
U.S. Patent Application Publication No. 2010/0177749;
U.S. Patent Application Publication No. 2010/0265880;
U.S. Patent Application Publication No. 2011/0202554;
U.S. Patent Application Publication No. 2012/0111946;
U.S. Patent Application Publication No. 2012/0168511;
U.S. Patent Application Publication No. 2012/0168512;
U.S. Patent Application Publication No. 2012/0193423;
U.S. Patent Application Publication No. 2012/0194692;
U.S. Patent Application Publication No. 2012/0203647;
U.S. Patent Application Publication No. 2012/0223141;
U.S. Patent Application Publication No. 2012/0228382;
U.S. Patent Application Publication No. 2012/0248188;
U.S. Patent Application Publication No. 2013/0043312;
U.S. Patent Application Publication No. 2013/0082104;
U.S. Patent Application Publication No. 2013/0175341;
U.S. Patent Application Publication No. 2013/0175343;
U.S. Patent Application Publication No. 2013/0257744;
U.S. Patent Application Publication No. 2013/0257759;
U.S. Patent Application Publication No. 2013/0270346;
U.S. Patent Application Publication No. 2013/0292475;
U.S. Patent Application Publication No. 2013/0292477;
U.S. Patent Application Publication No. 2013/0293539;
U.S. Patent Application Publication No. 2013/0293540;
U.S. Patent Application Publication No. 2013/0306728;
U.S. Patent Application Publication No. 2013/0306731;
U.S. Patent Application Publication No. 2013/0307964;
U.S. Patent Application Publication No. 2013/0308625;
U.S. Patent Application Publication No. 2013/0313324;
U.S. Patent Application Publication No. 2013/0332996;
U.S. Patent Application Publication No. 2014/0001267;
U.S. Patent Application Publication No. 2014/0025584;
U.S. Patent Application Publication No. 2014/0034734;
U.S. Patent Application Publication No. 2014/0036848;
U.S. Patent Application Publication No. 2014/0039693;
U.S. Patent Application Publication No. 2014/0049120;
U.S. Patent Application Publication No. 2014/0049635;
U.S. Patent Application Publication No. 2014/0061306;
U.S. Patent Application Publication No. 2014/0063289;
U.S. Patent Application Publication No. 2014/0066136;
U.S. Patent Application Publication No. 2014/0067692;
U.S. Patent Application Publication No. 2014/0070005;
U.S. Patent Application Publication No. 2014/0071840;
U.S. Patent Application Publication No. 2014/0074746;
U.S. Patent Application Publication No. 2014/0076974;
U.S. Patent Application Publication No. 2014/0097249;
U.S. Patent Application Publication No. 2014/0098792;
U.S. Patent Application Publication No. 2014/0100813;
U.S. Patent Application Publication No. 2014/0103115;
U.S. Patent Application Publication No. 2014/0104413;
U.S. Patent Application Publication No. 2014/0104414;
U.S. Patent Application Publication No. 2014/0104416;
U.S. Patent Application Publication No. 2014/0106725;
U.S. Patent Application Publication No. 2014/0108010;
U.S. Patent Application Publication No. 2014/0108402;
U.S. Patent Application Publication No. 2014/0110485;
U.S. Patent Application Publication No. 2014/0125853;
U.S. Patent Application Publication No. 2014/0125999;
U.S. Patent Application Publication No. 2014/0129378;
U.S. Patent Application Publication No. 2014/0131443;
U.S. Patent Application Publication No. 2014/0133379;
U.S. Patent Application Publication No. 2014/0136208;
U.S. Patent Application Publication No. 2014/0140585;
U.S. Patent Application Publication No. 2014/0152882;
U.S. Patent Application Publication No. 2014/0158770;
U.S. Patent Application Publication No. 2014/0159869;
U.S. Patent Application Publication No. 2014/0166759;
U.S. Patent Application Publication No. 2014/0168787;
U.S. Patent Application Publication No. 2014/0175165;
U.S. Patent Application Publication No. 2014/0191684;
U.S. Patent Application Publication No. 2014/0191913;
U.S. Patent Application Publication No. 2014/0197304;
U.S. Patent Application Publication No. 2014/0214631;
U.S. Patent Application Publication No. 2014/0217166;
U.S. Patent Application Publication No. 2014/0231500;
U.S. Patent Application Publication No. 2014/0247315;
U.S. Patent Application Publication No. 2014/0263493;
U.S. Patent Application Publication No. 2014/0263645;
U.S. Patent Application Publication No. 2014/0270196;
U.S. Patent Application Publication No. 2014/0270229;
U.S. Patent Application Publication No. 2014/0278387;
U.S. Patent Application Publication No. 2014/0288933;

U.S. Patent Application Publication No. 2014/0297058;
U.S. Patent Application Publication No. 2014/0299665;
U.S. Patent Application Publication No. 2014/0332590;
U.S. Patent Application Publication No. 2014/0351317;
U.S. Patent Application Publication No. 2014/0362184;
U.S. Patent Application Publication No. 2014/0363015;
U.S. Patent Application Publication No. 2014/0369511;
U.S. Patent Application Publication No. 2014/0374483;
U.S. Patent Application Publication No. 2014/0374485;
U.S. Patent Application Publication No. 2015/0001301;
U.S. Patent Application Publication No. 2015/0001304;
U.S. Patent Application Publication No. 2015/0009338;
U.S. Patent Application Publication No. 2015/0014416;
U.S. Patent Application Publication No. 2015/0021397;
U.S. Patent Application Publication No. 2015/0028104;
U.S. Patent Application Publication No. 2015/0029002;
U.S. Patent Application Publication No. 2015/0032709;
U.S. Patent Application Publication No. 2015/0039309;
U.S. Patent Application Publication No. 2015/0039878;
U.S. Patent Application Publication No. 2015/0040378;
U.S. Patent Application Publication No. 2015/0049347;
U.S. Patent Application Publication No. 2015/0051992;
U.S. Patent Application Publication No. 2015/0053769;
U.S. Patent Application Publication No. 2015/0062366;
U.S. Patent Application Publication No. 2015/0063215;
U.S. Patent Application Publication No. 2015/0088522;
U.S. Patent Application Publication No. 2015/0096872;
U.S. Patent Application Publication No. 2015/0100196;
U.S. Patent Application Publication No. 2015/0102109;
U.S. Patent Application Publication No. 2015/0115035;
U.S. Patent Application Publication No. 2015/0127791;
U.S. Patent Application Publication No. 2015/0128116;
U.S. Patent Application Publication No. 2015/0133047;
U.S. Patent Application Publication No. 2015/0134470;
U.S. Patent Application Publication No. 2015/0136851;
U.S. Patent Application Publication No. 2015/0142492;
U.S. Patent Application Publication No. 2015/0144692;
U.S. Patent Application Publication No. 2015/0144698;
U.S. Patent Application Publication No. 2015/0149946;
U.S. Patent Application Publication No. 2015/0161429;
U.S. Patent Application Publication No. 2015/0178523;
U.S. Patent Application Publication No. 2015/0178537;
U.S. Patent Application Publication No. 2015/0178685;
U.S. Patent Application Publication No. 2015/0181109;
U.S. Patent Application Publication No. 2015/0199957;
U.S. Patent Application Publication No. 2015/0210199;
U.S. Patent Application Publication No. 2015/0212565;
U.S. Patent Application Publication No. 2015/0213647;
U.S. Patent Application Publication No. 2015/0220753;
U.S. Patent Application Publication No. 2015/0220901;
U.S. Patent Application Publication No. 2015/0227189;
U.S. Patent Application Publication No. 2015/0236984;
U.S. Patent Application Publication No. 2015/0239348;
U.S. Patent Application Publication No. 2015/0242658;
U.S. Patent Application Publication No. 2015/0248572;
U.S. Patent Application Publication No. 2015/0254485;
U.S. Patent Application Publication No. 2015/0261643;
U.S. Patent Application Publication No. 2015/0264624;
U.S. Patent Application Publication No. 2015/0268971;
U.S. Patent Application Publication No. 2015/0269402;
U.S. Patent Application Publication No. 2015/0288689;
U.S. Patent Application Publication No. 2015/0288896;
U.S. Patent Application Publication No. 2015/0310243;
U.S. Patent Application Publication No. 2015/0310244;
U.S. Patent Application Publication No. 2015/0310389;
U.S. Patent Application Publication No. 2015/0312780;
U.S. Patent Application Publication No. 2015/0327012;
U.S. Patent Application Publication No. 2016/0014251;
U.S. Patent Application Publication No. 2016/0025697;
U.S. Patent Application Publication No. 2016/0026838;
U.S. Patent Application Publication No. 2016/0026839;
U.S. Patent Application Publication No. 2016/0040982;
U.S. Patent Application Publication No. 2016/0042241;
U.S. Patent Application Publication No. 2016/0057230;
U.S. Patent Application Publication No. 2016/0062473;
U.S. Patent Application Publication No. 2016/0070944;
U.S. Patent Application Publication No. 2016/0092805;
U.S. Patent Application Publication No. 2016/0101936;
U.S. Patent Application Publication No. 2016/0104019;
U.S. Patent Application Publication No. 2016/0104274;
U.S. Patent Application Publication No. 2016/0109219;
U.S. Patent Application Publication No. 2016/0109220;
U.S. Patent Application Publication No. 2016/0109224;
U.S. Patent Application Publication No. 2016/0112631;
U.S. Patent Application Publication No. 2016/0112643;
U.S. Patent Application Publication No. 2016/0117627;
U.S. Patent Application Publication No. 2016/0124516;
U.S. Patent Application Publication No. 2016/0125217;
U.S. Patent Application Publication No. 2016/0125342;
U.S. Patent Application Publication No. 2016/0125873;
U.S. Patent Application Publication No. 2016/0133253;
U.S. Patent Application Publication No. 2016/0171597;
U.S. Patent Application Publication No. 2016/0171666;
U.S. Patent Application Publication No. 2016/0171720;
U.S. Patent Application Publication No. 2016/0171775;
U.S. Patent Application Publication No. 2016/0171777;
U.S. Patent Application Publication No. 2016/0174674;
U.S. Patent Application Publication No. 2016/0178479;
U.S. Patent Application Publication No. 2016/0178685;
U.S. Patent Application Publication No. 2016/0178707;
U.S. Patent Application Publication No. 2016/0179132;
U.S. Patent Application Publication No. 2016/0179143;
U.S. Patent Application Publication No. 2016/0179368;
U.S. Patent Application Publication No. 2016/0179378;
U.S. Patent Application Publication No. 2016/0180130;
U.S. Patent Application Publication No. 2016/0180133;
U.S. Patent Application Publication No. 2016/0180136;
U.S. Patent Application Publication No. 2016/0180594;
U.S. Patent Application Publication No. 2016/0180663;
U.S. Patent Application Publication No. 2016/0180678;
U.S. Patent Application Publication No. 2016/0180713;
U.S. Patent Application Publication No. 2016/0185136;
U.S. Patent Application Publication No. 2016/0185291;
U.S. Patent Application Publication No. 2016/0186926;
U.S. Patent Application Publication No. 2016/0188861;
U.S. Patent Application Publication No. 2016/0188939;
U.S. Patent Application Publication No. 2016/0188940;
U.S. Patent Application Publication No. 2016/0188941;
U.S. Patent Application Publication No. 2016/0188942;
U.S. Patent Application Publication No. 2016/0188943;
U.S. Patent Application Publication No. 2016/0188944;
U.S. Patent Application Publication No. 2016/0189076;
U.S. Patent Application Publication No. 2016/0189087;
U.S. Patent Application Publication No. 2016/0189088;
U.S. Patent Application Publication No. 2016/0189092;
U.S. Patent Application Publication No. 2016/0189284;
U.S. Patent Application Publication No. 2016/0189288;
U.S. Patent Application Publication No. 2016/0189366;
U.S. Patent Application Publication No. 2016/0189443;
U.S. Patent Application Publication No. 2016/0189447;
U.S. Patent Application Publication No. 2016/0189489;
U.S. Patent Application Publication No. 2016/0192051;
U.S. Patent Application Publication No. 2016/0202951;
U.S. Patent Application Publication No. 2016/0202958;

U.S. Patent Application Publication No. 2016/0202959;
U.S. Patent Application Publication No. 2016/0203021;
U.S. Patent Application Publication No. 2016/0203429;
U.S. Patent Application Publication No. 2016/0203797;
U.S. Patent Application Publication No. 2016/0203820;
U.S. Patent Application Publication No. 2016/0204623;
U.S. Patent Application Publication No. 2016/0204636;
U.S. Patent Application Publication No. 2016/0204638;
U.S. Patent Application Publication No. 2016/0227912;
U.S. Patent Application Publication No. 2016/0232891;
U.S. Patent Application Publication No. 2016/0292477;
U.S. Patent Application Publication No. 2016/0294779;
U.S. Patent Application Publication No. 2016/0306769;
U.S. Patent Application Publication No. 2016/0314276;
U.S. Patent Application Publication No. 2016/0314294;
U.S. Patent Application Publication No. 2016/0316190;
U.S. Patent Application Publication No. 2016/0323310;
U.S. Patent Application Publication No. 2016/0325677;
U.S. Patent Application Publication No. 2016/0327614;
U.S. Patent Application Publication No. 2016/0327930;
U.S. Patent Application Publication No. 2016/0328762;
U.S. Patent Application Publication No. 2016/0330218;
U.S. Patent Application Publication No. 2016/0343163;
U.S. Patent Application Publication No. 2016/0343176;
U.S. Patent Application Publication No. 2016/0364914;
U.S. Patent Application Publication No. 2016/0370220;
U.S. Patent Application Publication No. 2016/0372282;
U.S. Patent Application Publication No. 2016/0373847;
U.S. Patent Application Publication No. 2016/0377414;
U.S. Patent Application Publication No. 2016/0377417;
U.S. Patent Application Publication No. 2017/0010141;
U.S. Patent Application Publication No. 2017/0010328;
U.S. Patent Application Publication No. 2017/0010780;
U.S. Patent Application Publication No. 2017/0016714;
U.S. Patent Application Publication No. 2017/0018094;
U.S. Patent Application Publication No. 2017/0046603;
U.S. Patent Application Publication No. 2017/0047864;
U.S. Patent Application Publication No. 2017/0053146;
U.S. Patent Application Publication No. 2017/0053147;
U.S. Patent Application Publication No. 2017/0053647;
U.S. Patent Application Publication No. 2017/0055606;
U.S. Patent Application Publication No. 2017/0060316;
U.S. Patent Application Publication No. 2017/0061961;
U.S. Patent Application Publication No. 2017/0064634;
U.S. Patent Application Publication No. 2017/0083730;
U.S. Patent Application Publication No. 2017/0091502;
U.S. Patent Application Publication No. 2017/0091706;
U.S. Patent Application Publication No. 2017/0091741;
U.S. Patent Application Publication No. 2017/0091904;
U.S. Patent Application Publication No. 2017/0092908;
U.S. Patent Application Publication No. 2017/0094238;
U.S. Patent Application Publication No. 2017/0098947;
U.S. Patent Application Publication No. 2017/0100949;
U.S. Patent Application Publication No. 2017/0108838;
U.S. Patent Application Publication No. 2017/0108895;
U.S. Patent Application Publication No. 2017/0118355;
U.S. Patent Application Publication No. 2017/0123598;
U.S. Patent Application Publication No. 2017/0124369;
U.S. Patent Application Publication No. 2017/0124396;
U.S. Patent Application Publication No. 2017/0124687;
U.S. Patent Application Publication No. 2017/0126873;
U.S. Patent Application Publication No. 2017/0126904;
U.S. Patent Application Publication No. 2017/0139012;
U.S. Patent Application Publication No. 2017/0140329;
U.S. Patent Application Publication No. 2017/0140731;
U.S. Patent Application Publication No. 2017/0147847;
U.S. Patent Application Publication No. 2017/0150124;
U.S. Patent Application Publication No. 2017/0169198;
U.S. Patent Application Publication No. 2017/0171035;
U.S. Patent Application Publication No. 2017/0171703;
U.S. Patent Application Publication No. 2017/0171803;
U.S. Patent Application Publication No. 2017/0180359;
U.S. Patent Application Publication No. 2017/0180577;
U.S. Patent Application Publication No. 2017/0181299;
U.S. Patent Application Publication No. 2017/0190192;
U.S. Patent Application Publication No. 2017/0193432;
U.S. Patent Application Publication No. 2017/0193461;
U.S. Patent Application Publication No. 2017/0193727;
U.S. Patent Application Publication No. 2017/0199266;
U.S. Patent Application Publication No. 2017/0200108; and
U.S. Patent Application Publication No. 2017/0200275.

In the specification and/or figures, typical embodiments of the invention have been disclosed. The present invention is not limited to such exemplary embodiments. The use of the term "and/or" includes any and all combinations of one or more of the associated listed items. The figures are schematic representations and so are not necessarily drawn to scale. Unless otherwise noted, specific terms have been used in a generic and descriptive sense and not for purposes of limitation.

In the description above, a flow charted technique may be described in a series of sequential actions. Unless expressly stated to the contrary, the sequence of the actions and the party performing the actions may be freely changed without departing from the scope of the teachings. Actions may be added, deleted, or altered in several ways. Similarly, the actions may be re-ordered or looped. Further, although processes, methods, algorithms or the like may be described in a sequential order, such processes, methods, algorithms, or any combination thereof may be operable to be performed in alternative orders. Further, some actions within a process, method, or algoritlm1 may be performed simultaneously during at least a point in time (e.g., actions performed in parallel), can also be performed in whole, in part, or in any combination thereof.

As used herein, the terms "comprises," "comprising," "includes," "including," "has," "having" or any other variation thereof, are intended to cover a non-exclusive inclusion. For example, a process, method, article, or apparatus that comprises a list of features is not necessarily limited only to those features but may include other features not expressly listed or inherent to such process, method, article, or apparatus. Further, unless expressly stated to the contrary, "or" refers to an inclusive-or and not to an exclusive-or. For example, a condition A or B is satisfied by any one of the following: A is true (or present) and B is false (or not present), A is false (or not present) and B is true (or present), and both A and 8 are true (or present).

What is claimed is:

1. A method for printing process control within a printer, comprising:
   determining, via a hardware processor of the printer, a printhead control signal (PCS) to regulate a print process of a printhead of the printer, said PCS comprising printhead control parameters to maintain a designated acceptable level of print quality by the printhead;
   encrypting, via the hardware microprocessor, the PCS;
   transmitting from the hardware microprocessor to the printhead the encrypted PCS;
   decrypting at the printhead the received encrypted PCS to obtain the unencrypted PCS; and
   regulating the print process of the printhead according to the PCS.

2. The method of claim 1, further comprising:
transmitting print data from the hardware processor to the printhead along a first hardware data path; and
transmitting the encrypted PCS from the hardware processor to the printhead along a second hardware data path which is isolated from the first hardware data path.

3. The method of claim 1, further comprising decrypting at the printhead the received encrypted PCS via at least one of a general purpose hardware processor of the printhead and a dedicated hardware decryption processor of the printhead.

4. The method of claim 1, wherein the encryption and decryption of the PCS comprises encrypting and decrypting the PCS according to an asymmetric encryption/decryption algorithm.

5. The method of claim 1, wherein the PCS comprises data to determine, for a contrast-inducing element to be applied by the printhead to a print media of the printer, at least one of:
a quantity of the contrast-inducing element to be applied along a line of the print output;
an intensity of the contrast-inducing element to be applied along the line of the print output; and
a time duration of application of the contrast-inducing element along the line of the print output.

6. The method of claim 5, wherein:
the line printed on the print media comprises a plurality of segments, wherein:
each segment of the plurality substantially overprints, on the print media, the other segments of the plurality; and
each segment of the plurality is generated in series in time, each segment being generated at least one of prior to or subsequent to any other segment of the plurality; and
the PCS comprises data to determine a respective quantity of the contrast-inducing element, a respective intensity of the contrast-inducing element, or a respective time duration of the contrast-inducing element for each respective segment of the plurality of substantially overprinted segments.

7. The method of claim 5, wherein:
the line is printed via a plurality of overprinted, time-consecutive print operations on the print media by the printhead, and:
the PCS comprises data to determine a respective quantity of the image-inducing element, a respective density of the image-inducing element, or a respective time-duration of the image-inducing element for each respective overprint operation of the plurality.

8. The method of claim 1, wherein decrypting at the printhead the received encrypted PCS to obtain the unencrypted PCS comprises using a decryption key to recover the printhead control parameters.

9. The method of claim 1, wherein the encrypting and decrypting occur internally within the printer.

10. A printer, comprising:
a first hardware processor;
a printhead comprising;
a contrast-generating element for printing an image on a print media; and
a second hardware processor configured for data decryption; wherein:
said first hardware processor is configured to:
determine a printhead control signal (PCS) to regulate a print process of the printhead, said PCS comprising printhead control parameters to maintain a designated acceptable level of print quality by the printhead; and
encrypt the PCS; and
said second hardware processor is configured to
decrypt the received encrypted PCS to obtain the unencrypted PCS, wherein the print process of the printhead is regulated according to the PCS.

11. The printer of claim 10, wherein said printhead further comprises:
a data connection internal to the printhead between the contrast-generating element and the second hardware processor, wherein said connection is configured and arranged so as to physically secure the printhead from external monitoring of data signals internal to the printhead.

12. The printer of claim 11, wherein said printhead comprises a casing which substantially shields the contrast generating element, the second hardware processor, and the internal data connection from external signal monitoring.

13. The printer of claim 10, further comprising:
a first hardware data path configured to transmit print data from the first hardware processor to the printhead; and
a second hardware data path which is data-isolated from the first hardware data path, and is configured to transmit the encrypted PCS from the first hardware processor to the printhead.

14. The printer of claim 10, wherein:
said printhead comprises a thermal printhead which applies heat to a heat-sensitive print media of the printer; and
said processor is configured to generate a PCS to regulate an application of heat by the thermal printhead to the heat-sensitive media.

15. The printer of claim 14, wherein:
the thermal printhead is configured to print a raster line on the print media, the line being printed via a plurality of overprinted, time-consecutive heat applications on the print media by the thermal printhead, and
the processor is configured to generate a PCS comprising timing data to determine a respective on/off time-segment duration for heat generation for each respective overprint operation of the plurality.

16. The printer of claim 10, wherein decryption of the received encrypted PCS to obtain the unencrypted PCS recovers the printhead control parameters.

17. The printer of claim 10, wherein encryption and decryption occur internally within the print.

* * * * *